(12) United States Patent
Okamoto

(10) Patent No.: US 8,615,625 B2
(45) Date of Patent: Dec. 24, 2013

(54) DISK ARRAY SYSTEM

(75) Inventor: Homare Okamoto, Odawara (JP)

(73) Assignee: Hitachi, Ltd., Tokyo (JP)

(*) Notice: Subject to any disclaimer, the term of this patent is extended or adjusted under 35 U.S.C. 154(b) by 165 days.

(21) Appl. No.: 12/457,148

(22) Filed: Jun. 2, 2009

(65) Prior Publication Data
US 2009/0240879 A1 Sep. 24, 2009

Related U.S. Application Data

(63) Continuation of application No. 10/998,552, filed on Nov. 30, 2004, now Pat. No. 7,558,912.

(30) Foreign Application Priority Data

Oct. 4, 2004 (JP) ................................. 2004-291284

(51) Int. Cl.
G06F 12/06 (2006.01)
(52) U.S. Cl.
USPC .................... 711/113; 711/114; 711/E12.019
(58) Field of Classification Search
USPC .................................................. 711/113, 114
See application file for complete search history.

(56) References Cited

U.S. PATENT DOCUMENTS

| | | | |
|---|---|---|---|
| 4,633,387 A * | 12/1986 | Hartung et al. ................ 718/105 |
| 5,548,724 A | 8/1996 | Akizawa et al. |
| 5,906,658 A | 5/1999 | Raz |
| 6,477,619 B1 | 11/2002 | Fujimoto et al. |
| 6,542,961 B1 | 4/2003 | Matsunami et al. |
| 6,810,462 B2 | 10/2004 | Matsunami et al. |
| 6,886,086 B2 | 4/2005 | Kobayashi et al. |
| 6,950,915 B2 | 9/2005 | Ohno et al. |
| 7,017,003 B2 | 3/2006 | Murotani et al. |
| 2003/0188045 A1 | 10/2003 | Jacobson |
| 2003/0204671 A1 * | 10/2003 | Matsunami et al. .......... 711/112 |
| 2005/0149667 A1 | 7/2005 | Nakayama et al. |
| 2005/0177680 A1 | 8/2005 | Miura |
| 2005/0188170 A1 | 8/2005 | Yamamoto |
| 2005/0216692 A1 | 9/2005 | Watanabe et al. |

FOREIGN PATENT DOCUMENTS

| | | |
|---|---|---|
| JP | 3-262074 | 11/1991 |
| JP | 6-332782 | 12/1994 |
| JP | 7-249013 | 9/1995 |

(Continued)

OTHER PUBLICATIONS

Japanese office action on application No. 2004-291284 dated Jan. 25, 2011; 3 pages (with partial English-language translation, 2 pages).

Primary Examiner — Kenneth Lo
(74) Attorney, Agent, or Firm — Foley & Lardner LLP

(57) ABSTRACT

A technique to distribute processing to meet a request from other system without partializing the processing to specific processor and can execute processing efficiently while adopting configuration to control one port unit by multiple processors at channel adapter of disk array system. CHA of a controller has a port unit carrying out interface operation and multiple host processor units having host processors. Multiple processors operate in parallel and control the port unit. When the port unit receives a request from other system, the first processor takes charge of the processing on the basis of the judgment of the processing load condition in processors including itself and in the event that the second processor is assigned the processing, the first processor communicates with the protocol unit and transfers the request to the second processor unit to enable the second processor to take charge of the processing.

13 Claims, 12 Drawing Sheets

(56) References Cited

FOREIGN PATENT DOCUMENTS

| JP | 8-272729 | 10/1996 |
| JP | 9-233117 | 9/1997 |
| JP | 2001-318904 | 3/2001 |
| JP | 2002-049602 | 2/2002 |
| JP | 2003-316713 | 11/2003 |
| JP | 2003-316715 | 11/2003 |

* cited by examiner

FIG.8 <Write-time flow (continued)>

DISK ARRAY SYSTEM

CROSS-REFERENCE TO RELATED APPLICATION

This application is a Continuation application of U.S. Ser. No. 10/998,552 filed Nov. 30, 2004 now U.S. Pat. No. 7,558,912. Priority is claimed based upon U.S. Ser. No. 10/998,552 filed Nov. 30, 2004, which claims priority from Japanese Patent Application No. 2004-291284 filed on Oct. 4, 2004, all of which is hereby incorporated by reference into this application.

TECHNICAL FIELD OF THE INVENTION

The present invention relates to a disk array system (RAID storage system) which carries out control storing of data in storage unit such as hard disk drive (HDD) and others, and more specifically, a disk array system related to a technique of channel control unit (channel adapter) that carries out data transfer interface operation with other system such as host computer and others telecommunicated to the disk array system.

BACKGROUND OF THE INVENTION

In a computer system configured with disk array system and other system such as host computer and others telecommunicated to the disk array system included, a transmission rate of network that connects between systems is more and more increased. To respond to this increase, in a controller of conventional disk array system, a channel adapter of a configuration to control one port unit by multiple processors (host processor units). In communication between host computer and other system and a channel adapter via network under this configuration, a port unit receives commands (data access request) related to data input/output from other system and data transfer processing to meet the received command is carried out by the processor. The data transfer processing in such event is carried out by any of the plural processors which have a channel adapter inside. Examples of the data transfer processing include processing to transfer read data from HDD to other system side in data read processing that supports the read command, processing to transfer write data from the other system side to HDD in data write processing that supports the write command, and others. In the data transfer processing, typically, the read/write data is temporarily cached by the memory held in the controller.

In the technique described in Japanese Patent Application Laid-Open Publication No. 2001-318904, a method for distributing data access task between a large number of storage unit controllers or a large number of processors is provided.

SUMMARY OF THE INVENTION

In the conventional configuration, when data transferring processing that supports the received command from other system is carried out by any of plural processors which are located in a channel adapter, which processor should be designated to carry out the processing is uniquely decided by a specified system. Consequently, depending on how things go, processing requests are partialized to a specific processor, applying a large load to the processor, and it is inefficient on the whole.

For example, in the technique described in the above-mentioned document (Japanese Patent Application Laid-Open Publication No. 2001-318904), it is assumed that the distributed places are uniquely decided in distributing processing (data access task) in plural storage controllers or processors. That is, by the table referred from the processor, it is uniquely decided which data access to redundancy group (disk array) is made by each one of multiple processors, and a processor which processing cases the request (command) is specified in accordance with the relevant table. Consequently, when the processing type is partialized, the processing efficiency in plural processors may be lowered. In addition, in this technique, it is assumed that a form to directly transfer the request (command) from one processor to the other processor is adopted in order to distribute processing at plural processors.

The present invention was made in view of the above-mentioned problems, and the object of the present invention is to provide a technique to distribute processing that supports requests (commands) from other system without partially concentrating processing to specific processors while adopting a configuration to control one port unit by plural processors in a channel adapter which carries out data transfer interface operation with other system in a disk array system.

Of the inventions disclosed in the application concerned, the outline of typical ones can be briefly described as follows.

In order to achieve the above-mentioned objects, the disk array system according to the present invention has a storage unit such as HDD and others and a controller that controls the storage of data in the storage unit, and in the controller, a channel control unit (channel adapter) that carries out data transfer interface operation with other system such as host computer and others connected through communication means in conformity to the interface protocol, and the channel control unit has a configuration that has a plurality of host processor units for one port unit, and is a unit that carries out input/output processing such as read/write, etc. of the data for the storage volume on the storage unit in accordance with a request (command) received from other system, and has following technical means.

In the present disk array system, a channel control unit of the controller comprises a port unit, a plurality of host processor units, and a data transfer control unit. The port unit carries out data transmission and reception with other system via the communication means, and carries out communication for control among the plural host processor units, and carries out data transfer to memory and storage unit side in the controller via the data transfer control unit.

The port unit is configured to have, for example, a transceiver and a protocol unit. The transceiver carries out data transmission and reception to the network connected to the disk array system and other system. The protocol unit carries out communication control in conformity to the interface protocol on the network. The protocol unit has an information area (register, etc. that stores the pointer information) that stores control information for communication between the plural host processor units. Each processor in the plural host processor units operates in parallel in accordance with the control program (channel adapter driver) which is installed on the nonvolatile memory and controls interface operation of one port unit.

The host processor unit has a configuration which has, for example, a processor (host processor) and the control program (channel adapter driver), and memory for storing the control information (host processor local memory).

The data transfer control unit controls transfer of I/O data between the port unit and memory that holds I/O data in the controller, for example, cache memory and memory installed in the channel control unit.

In the above-mentioned configuration, when a request (command) is received from other system, which one of the multiple processors in the channel control unit should take charge of the processing related to data transfer with other system side that supports the request is not uniquely decided in accordance with a fixed setting but the processing is distributed in response to the request by plural processors according to the processing load condition of one or more processors or judgment of the processing handling condition each time the request is received.

In order to distribute the processing, one of any plural processors in the channel control unit is set as a master (representative) processor (first processor) which undertakes a role to first receive the request from the other system through the port unit. The host processor unit which has the first processor is designated as the first host processor unit.

The port unit transmits (transfers) all the requests received from other system temporarily to the first host processor unit. That is, the port unit notifies a message to the effect that "there is a request to be processed" temporarily to the first host processor unit for the request received from the other system. In such event, for example, the port unit writes the message in the information area of memory of the first host processor unit and at the same time updates the pointer information shown in the message position.

The first processor judges whether or not the processor is appropriate to take charge of processing with the processing load condition of plural processors including itself in carrying out the processing in response to the request. In addition, the judgment may be made with the processing load condition only taken into account in the processor itself.

In the event that the first processor judges that the processor itself takes charge of processing in the judgment concerning the handling of the processing, the first processor takes charge of processing in response to the request as it is, and in the event that the first processor judges that it does not take charge of the processing or judges to assign other processor the processing, the first processor communicates with the port unit, transfers the request from the first processor to other processor via the port unit and assigns it the processing in response to the request.

In the channel control unit and of other processors other than the first processor, a processor which is designated to take charge of processing (distributed place) in accordance with the judgment and instruction at the first processor shall be the second processor. The host processor which has the second processor shall be designated as the second host processor unit.

The request is transferred by the port unit from the first processor to the second processor. For example, in the event that the first processor decides to assign the second processor the processing as the other processor, the first processor stores a message for giving the other processor charge of the processing in the information area of memory in the first host processor, and notifies to the information area which the protocol unit of the port unit possesses to read the message. The protocol unit of the port unit instructs the second processor to take charge of processing that supports the request on the basis of the recognition of the message notified by the first processor. That is, the protocol unit of the port unit stores a message to the effect of "there is a request to be processed" for the information area of memory in the second host processor unit, updates the pointer information that indicates the message position, and makes the second processor to read the message. The second processor takes charge of and executes the processing in response to the transfer of the request.

As a communication means for distributing the processing, for example, the protocol unit has an information area (OMI and IMO) to store the pointer information for communication with each host processor unit. In addition, the host processor unit has local memory, and in the local memory, the host processor unit has an information area (OM area, IM area) for storing the messages or command for communication with the protocol unit, an information area (OMO, IMI) for storing the pointer information that indicates the position of message or command, an information area (DI area) for storing the information concerning transfer of the data to be processed. In the communication to distribute the processing, the protocol unit reads/writes the information area on the host processor unit side and the processor reads/writes the information area on the protocol unit side.

Examples of the judgment method to distribute the processing cases in the channel control unit by multiple processors include the following: (1) the first processor counts the number of processing cases which must be handled by each processor (processing cases in its charge), and judges that a processor with the least number of processing cases in its charge is in the condition with the least processing load and assigns it the processing; (2) the first processor counts a total of the number of data transferred which each processor must handle, that is, not the number of processing in their charge but the processing load with even the content such as the number of data transferred in processing, the volume of data transferred, and others in processing calculated, makes judgment, and assigns the processing to a processor with the least processing load.

Of the inventions disclosed in the application concerned, the effects obtained by the representative ones can be briefly explained as follows.

According to the present invention, in a channel adapter which is installed into disk array system and carries out data transfer interface operation with other system, while adopting a configuration to control one port unit with multiple processors, processing that supports a request (command) from other system can be distributed and efficiently executed without partializing the processing cases to a specific processor, and the work with multiple processors efficiently used is enabled. By this effect, it becomes possible to increase the speed of data transfer processing associated with the increased transfer rate of the network. In addition, in particular, in the channel adapter, distribution of processing can be achieved using a processor of comparatively simple and inexpensive configuration which does not have a means for communicating directly and mutually with other processors but has a communication means only with the protocol unit.

BRIEF DESCRIPTIONS OF THE DRAWINGS

DESCRIPTION OF THE PREFERRED EMBODIMENTS

Figure 1:
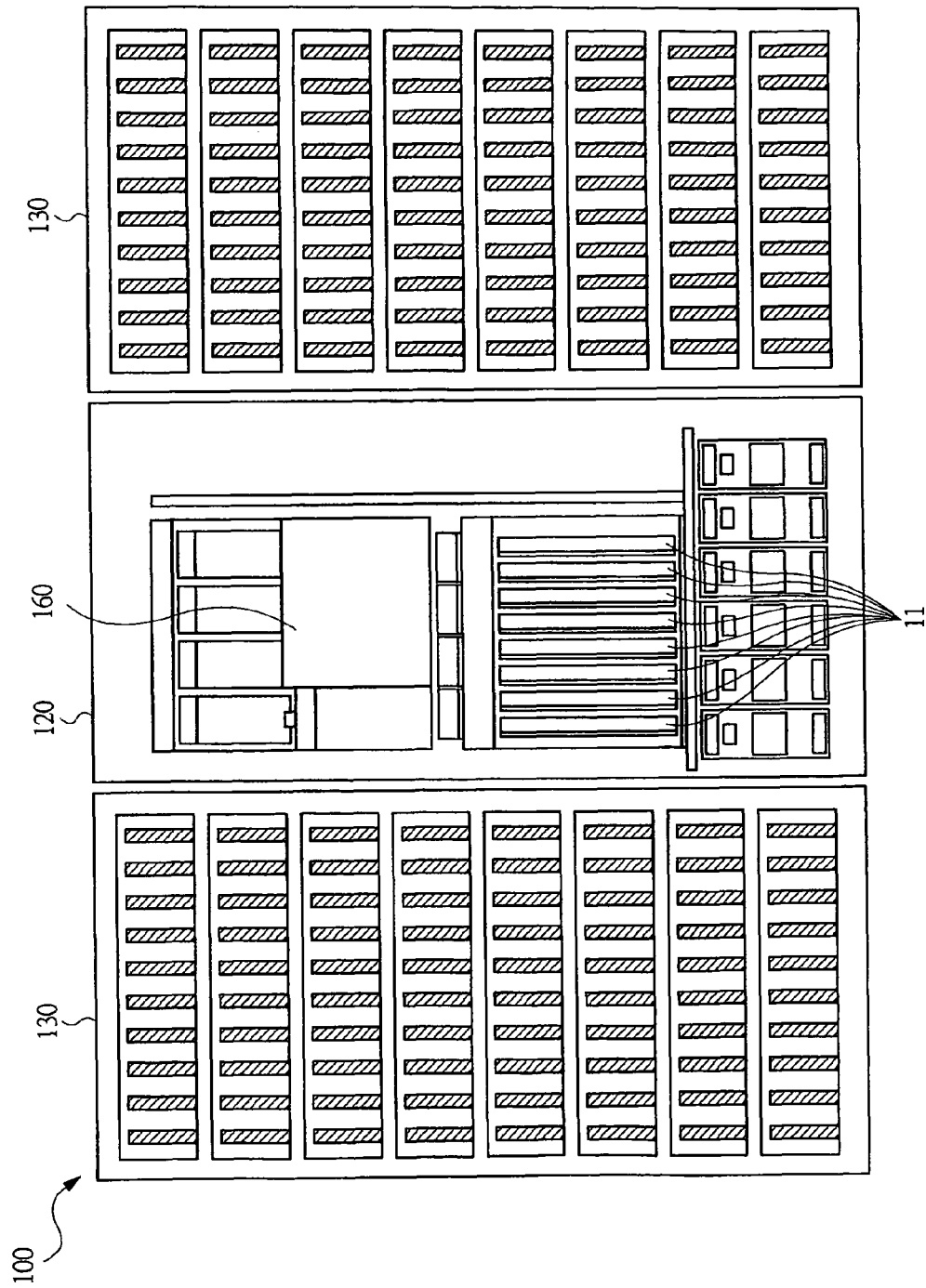
FIG. 1 is a view of a hardware appearance configuration of a disk array system according to the embodiment 1 of the present invention.

Referring now to drawings, embodiments of the present invention will be discussed in detail. By the way, like reference characters designate like or corresponding parts throughout in all the drawings for explaining the embodiments and the repeated explanation will be omitted.

Embodiment 1

FIG. 1 through FIG. 11 are drawings to explain the disk array system in the embodiment 1 of the present invention. In the disk array system according to the embodiment 1, in CHA which configures a controller, it is constructed to control one port unit with two host processor units, and the processing to meet a request is distributed with the two host processors. At the port unit, the request (command) received from other system is temporarily transferred to the first host processor which serves as a representative (master), and judges whether the processing to meet this request is carried out in the first host processor as it is with the processing load condition of the first host processor and other host processors in CHA taken into account, and in the event that other host processor units are assigned the processing in accordance with the judgment, the request is transferred to the second host processor unit via the communication between the first host processor unit and a protocol unit of the port unit, and the processing is allowed to be carried out at the second host processor.

<Hardware Configuration>

Description will be first made on the overall configuration of the disk array system of the embodiment 1. Then, characteristic processing in the present invention will be discussed. FIG. 1 is a view of a hardware appearance configuration of a disk array system 100 according to the embodiment 1. In particular, the configuration as viewed from the front of the disk array system 100 is shown.

In FIG. 1, the disk array system 100, as one form, primarily comprises a control housing 120 that primarily accommodates a controller (disk array control unit) 10, and an HDD housing 130 that primarily accommodates a plurality of HDD 30. On both sides of one control chassis 120, HDD chassis 130 and 130 are arranged.

In control housing 120, a plurality of boards (circuit boards) that compose the controller 10 later discussed and miscellaneous units such as power supply, display panel, and others are connected through a backboard not illustrated. In the control housing 120, at the center front, a notebook type PC form control terminal (SVP: Service Processor) 160 protected by a cover is provided. By opening the cover, the control terminal 160 can be used. At the bottom of the control terminal 160, multiple slots are provided to mount boards which compose a channel adapter (CHA) 11. It is possible to mount or remove one CHA 11 or other board to each slot. As an example, eight pieces of CHA 11 boards are mounted. To each slot, guide rails for inserting and removing a board are installed and a board is inserted and removed along guide rails. In the far direction of each slot, a connector to electrically connect the board to the controller 10 is positioned, and the connection is achieved by connecting the board-side connector section. It is possible to increase, reduce, and replace boards by maintenance personnel and others as required. Other disk adapter 14, etc. which compose the controller 10 are mounted to the control housing 120 in the same manner. In the HDD housing 130, a disk unit integrating HDD 30 with a mechanism such as canister, etc. is removably connected in a large quantity and in many stages.

<Computer System Configuration>

Figure 2:
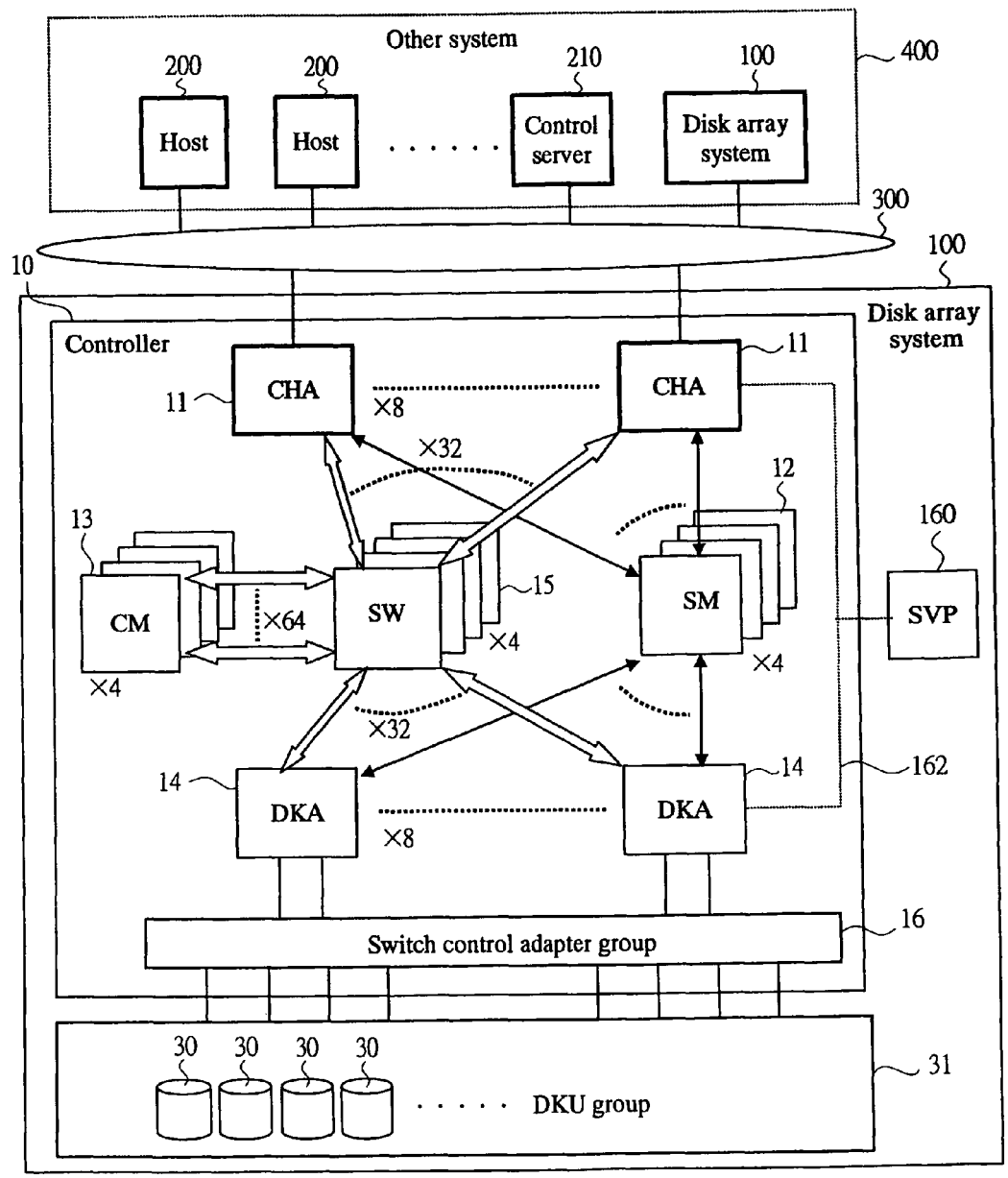
FIG. 2 is a view of a configuration of a whole computer system including a disk array system according to the embodiment 1 of the present invention.

FIG. 2 shows the configuration of the whole computer system including the disk array system 100. The computer system has a configuration to connect one or more disk array system 100 to one or more other system 400 via network 300. Examples of other system 400 include a host computer 200 and a control server 210 which the user uses, or other disk array system 100, and others. The network 300 is a network that supports the mainframe-based communication protocol, a network such as SAN (Storage Area Network), LAN (Local Area Network), and others, or a network in which these are mixed.

Other system 400 has a communication interface unit which controls communication with CHA 11 of the controller 10 on the disk array system 100 side via the network 300. The control server 210 is a computer with disk array system maintenance and control software installed.

The disk array system 100 is primarily equipped with the controller 10 and multiple HDD 30 (disk units) connected to controller 10, and is connected to the network 300 by CHA 11 which composes a part of the controller 10. In addition, other disk array system 100 is installed to a place (secondary site) remote from the location (primary site) of a disk array system 100 so that remote communication is enabled. Between disk array systems 100, execution of, for example, remote copy, replication, and others is possible for data maintenance.

The host 200 is a computer used by the user, and is, for example, PC, workstation, or mainframe computer. The host 200 utilizes various functions which the disk array system 100 provides by transmitting commands (requests) to the disk array system 100. The host 200 and the disk array system 100 are telecommunicated by a specified communication protocol via the network 300. Communication between the host 200 and the disk array system 100 is carried out in compliance with a communication protocol such as ESCON (Enterprise System CONnection) (registered trademark), FICON (FIbre CONnection) (registered trademark), and others in the case of connections when the host 200 is of a mainframe system. In addition, it is carried out in compliance with the communication protocol which is compatible with SAN, LAN, etc. in the connection when the host 200 is of an open system.

The controller 10 carries out various controls related to the data storage in accordance with the command received from other system 400 by CHA 11. For example, read commands or write commands from the host 200 are received and data I/O processing (read/write processing) is carried out for the storage volume on HDD 30. In addition, the controller 10 transfers and receives various commands to control the disk array system 100 with other system 400, too. In addition, to the group of HDD 30, the disk array (RAID group) is set, and a logical device (LDEV) can be set on the RAID group and control of the specified RAID system is enabled.

A plurality of HDD 30 are connected to each DKA 14 of controller 10 by connection cable of a type such as FC-AL, etc. For the storage unit to be connected to the controller 10, not only HDD 30 but also various units such as flexible disk units, semiconductor storages unit, and others can be used. Between DKA 14 and HDD 30, a form to be connected via the switch control adapter group 16 as shown in FIG. 2 or a form directly connected, and others are possible. Furthermore, it is possible to form the HDD 30 side integral with the controller 10.

The data is stored in the storage volume (logical device or logical unit) provided by one or more HDD 30, that is, a physical storage area on the disk or in a storage area logically established on a physical storage area. Examples of storage volume to be established on HDD 30 include a user data area which is accessible from the host 200 and in which the user data is stored, a system area and others used for storing the system data, etc. for system control. In addition, it is also possible to assign the storage volume which can be accessed in control units such as CHA 11 and others. Furthermore, in the assignment, setting at which one storage volume is shared by multiple CHA 11 is possible.

In HDD 30, position information (physical address) which identifies in which position of the physical storage area on the disk the data is read and written is possessed. For example, in HDD 30, by designating the position information such as a cylinder and a track, it is possible to write and read the data at an optional position on the disk as random access. In inputting and outputting the data on the disk, the logical address and the physical address in the disk are converted by processing at DKA 14 and others.

<Host Computer>

Figure 3:
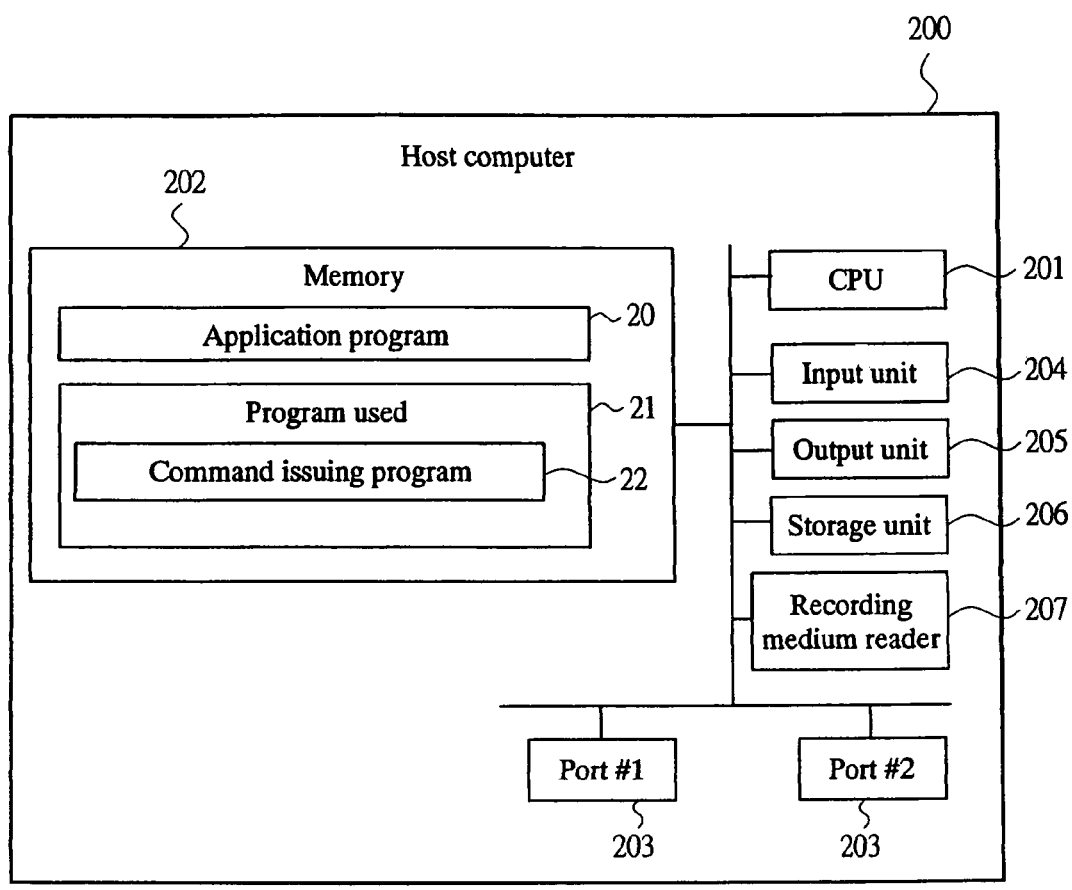
FIG. 3 is a functional block configuration diagram of a host computer telecommunicated to the disk array system of the first embodiment of the present invention.

FIG. 3 is a functional block configuration of a host 200 telecommunicated to the disk array system 100. The host 200 comprises CPU 201, memory 202, port 203, input unit 204, output unit 205, storage unit 206, recording medium reader 207, and others. Various functions can be achieved by executing programs on the memory 202 by CPU 201. On the memory 202, an application program 20 and a utilized program 21 are possessed. The port 203 is a unit which is connected to the network 300 and communicates between the disk array system 100 and other host 200, and others. Examples of the input unit 204 include a keyboard, mouse, and others for operation by the user. The output unit 205 is a display for displaying information. Examples of the storage unit 203 include, for example, HDD, semiconductor storage unit, and others. The recording medium reader 207 is a device to read programs and data recorded in the recording medium. The program and the data read are stored in the memory 202 and storage 203. The recording medium is, for example, a flexible disk, CD-ROM, and others.

The application program 20 is a program which controls on-line processing, etc. by the use of functions which the disk array system 100 provides. The host 200 provides various information processing services by executing the application program 20 while appropriately accessing to the data stored in the storage volume of the disk array system 100. Examples of the information processing service include automatic deposit/cash dispenser system of banks and others.

The utilized program 21 is a program which utilizes various functions which the disk array system 100 provides, and is equipped with a command issuing program 22 to issue various requests (commands) such as read/write commands and others for inputting and outputting data to HDD 30. In addition, in particular, when the host 200 is a control server 210, the utilized program 21 is equipped with various functions for maintenance and control same as the control terminal 160.

<Controller>

The controller 10 comprises CHA (channel adopter) 11, SM (shared memory) 12, CM (cache memory) 13, DKA (disk adapter) 14, SW (switch control adapter) 15, bus, and others. It has a configuration in which each processing unit of CHA 11 and others are mounted by a board, respectively, and processing units are mutually and fast-accessibly connected by SW 15 and others. Each board is mounted and connected to the chassis of the disk array system 100 as required. In addition, by preparing multiple pieces of each board and connecting them mutually, a configuration in which the data path to HDD 30 is multiplexed is obtained. In the present embodiment, each CHA 11 and DKA 14 are directly connected to SM 12 by bus and connected to CM 13 via SW 15. In addition, it is also possible to have a form with the controller 10 further multiplexed as illustrated. By the multiplexing configuration, improved performance by parallel processing and fault-tolerance can be achieved.

Each CHA 11 and DKA 14 is mutually communicably connected through internal LAN 162, and is also connected to control terminal (SVP) 160. By this, it becomes possible to transmit a program to be executed by CHA 11 or DKA 14 from the control terminal 160 and achieve installation thereof, etc.

SM 12 and CM 13 are memories shared by CHA 11 and DKA 14. SM 12 is primarily utilized for storing control information, commands, etc., while CM 13 is utilized to primarily store data (user data). SM 12 temporarily holds commands and others transferred and received between CHA 11 and DKA 14. CM 13 temporarily holds data transferred and received between CHA 11 and DKA 14. In the case of the configuration shown in FIG. 2, it is a configuration in which four pieces of SM 12 and four pieces of CM 13 are connected in the controller 10. SW 15 controls the data transfer between CHA 11 or DKA 14 and CM 13, and a plurality of SWs 15 exist. In the case of the configuration shown in FIG. 2, it is a configuration in which four pieces of boards of SW 15 of the same functions are connected in the controller 10.

CHA 11 is achieved by hardware formed on a board integrally unitized and software executed by this hardware. In the configuration shown in FIG. 2, the configuration is achieved by connecting eight pieces of CHA 11 with same functions to the controller 10. CHA 11 is a portion which achieves the characteristic processing of the present invention. CHA 11 may be connected in the disk array system 100 in various kinds and in a plurality in accordance with the communication protocol with other system 400. It is possible to achieve a disk array system which is connected to different kinds of networks by mixing and connecting CHA 11 which are compatible to each communication protocol in the controller 10.

CHA 11 receives requests from other system 400 such as host 200 and others one by one. CHA 11 is connected by the physical link or logical path on the physical link to the port 203 on the host 200 side. Further, in other CHA 11, it is possible to be telecommunicated to other system 400 by different physical link and logical path. When CHA 11 receives an access request such as block access request and others from other system 400, it converts the request to a data I/O request to DKA 14 and outputs. In addition, in the case of write-processing, it is possible to include the write data in the request.

DKA 14 carries out control to HDD 30. In the case of the configuration shown in FIG. 2, it is a configuration in which eight pieces of boards of DKA 14 with same function are connected in controller 10. DKA 14 writes the write data to the storage area on HDD 30 in accordance with the write command which, for example, CHA 11 receives from host 200. In addition, it carries out processing to convert the data access request transmitted by CHA 11 by designating the logical address to the data access request to the physical disk by designating the physical address. In addition, DKA 14 carries out control such as parallel access and others in accordance with the RAID system when RAID control to the RAID group is carried out. In addition, DKA 14 can carry out control concerning backup of the data stored in HDD 30, control to transfer the copy for the data of the disk array system 100 of the primary site to the disk array system 100 of the secondary site, and other controls, too.

The transmission and receipt of the data and command on the CHA 11 side and on the DKA 14 side are carried out via SM 12, CM 13, SW 15, and others. Communication between CHA 11 and DKA 14 takes place, for example, as follows. In the event that the command which CHA 11 receives from host 200 is a write command, the CHA 11 writes the write command to SM 12 and at the same time writes the write data (write target data) received from host 200 in CM 13. On the other hand, DKA 14 monitors SM 12, and when it detects that the write command is written to SM 12, processing is carried out to read the write data from CM 13 in accordance with the write command and write the data in HDD 30.

In addition, in the event that the command which a CHA 11 receives from a host 200 is a read command, the CHA 11 writes the read command in SM 12 as well as examines whether any read data (read target data) exists on CM 13. If any read data exists in CM 13, CHA 11 carries out processing to transmit the read data to host 200. On the other hand, in the event that there exists no read data in CM 13, DKA 14 which detected by monitoring SM 12 that a read command is written in SM 12 reads the read data from HDD 30 and writes this in CM 13 as well as writes the effect in SM 12. And CHA 11 carries out processing to transmit the read data to host 200 when it detects by monitoring SM 12 that the read data is written in CM 13.

By the way, in addition to the configuration in which directions to write and read the data from CHA 11 to DKA 14 are given indirectly with SM 12 intervened, for example, a configuration to give the direction from CHA 11 to DKA 14 directly without intervention of SM 12 can be adopted. In addition, it is a configuration in which SM 12 and CM 13 are installed independently to CHA 11 and DKA 14, but forms in which SM 12 and CM 13 are installed dispersedly to CHA 11 or DKA 14, respectively, are also possible. In such event, it becomes a form in which each processing unit which has dispersed memories is connected one another.

The storage volume which the controller 10 of the disk array system 100 controls is, for example, a logical device (LDEV). LDEV is a storage volume established on the RAID group comprising multiple HDD 30, and RAID control, for example, control by RAID 5 and other system, is carried out in units of LDEV by the controller 10. For example, by the controller 10, one RAID group is established by four HDD 30 {#1 through #4}. And on this RAID group, multiple LDEVs extending over four HDD 40 are set. In LDEV, for example, the data striped to, for example, HDD#0-HDD#2 are stored and the parity is stored in HDD#3. In addition, the logical unit (LU) set on HDD 30 is a physical storage volume as viewed from the host 200 side and is converted to the physical storage volume on the disk array system 100 side.

<Control Terminal>

The control terminal (SVP: Service Processor) 160 is a computer that maintains and controls the disk array system 100, and is equipped with software for maintenance/control processing of the disk array system 100. The control terminal 160 is available with a form incorporated in the disk array system 100 or a form externally mounted. In addition, control terminal 160 is available in a form of a computer exclusively specialized for maintenance and control of the disk array system 100 or a form with maintenance and control functions provided to PC. In addition, the control terminal 160 can be connected to LAN, telephone line, and others, and the form of remote console in which the control terminal is connected remotely to the disk array system 100 is possible, too. Furthermore, the control terminal 160 is connected to external maintenance center and others through LAN and others. The maintenance personnel operate the control terminal 160 and carry out various maintenance and control services. By operating the control terminal 160, it is possible to, for example, set the physical disk configuration or logical device of HDD 30, set logical paths, and install programs executed in CHA 11 and others. For setting physical disk configuration, for example, expansion or reduction of HDD 30, or change of RAID configuration, and others can be carried out. Furthermore, confirmation of operating condition of disk array system 100, identification of trouble portion and other operations can be carried out, too. Various settings and controls are carried out with the Web page provided by the Web server which operates at the control terminal 160 used as a user interface.

The control terminal 160 is equipped with CPU, memory, port, input unit, output unit, storage unit, recording medium reader, and others same as the hardware configuration of host 200 if it is of a PC form. Various functions for maintenance and control are achieved by CPU which executes control programs on memory. To the memory, control program and various pieces of information related to maintenance and control are stored. The port of the control terminal 160 is connected to internal LAN 162, making it possible to communicate with CHA 11, DKA 14, and others. In addition, the port may be connected to LAN, telephone line, and others.

<Configuration for Processing Distributions

Figure 4:
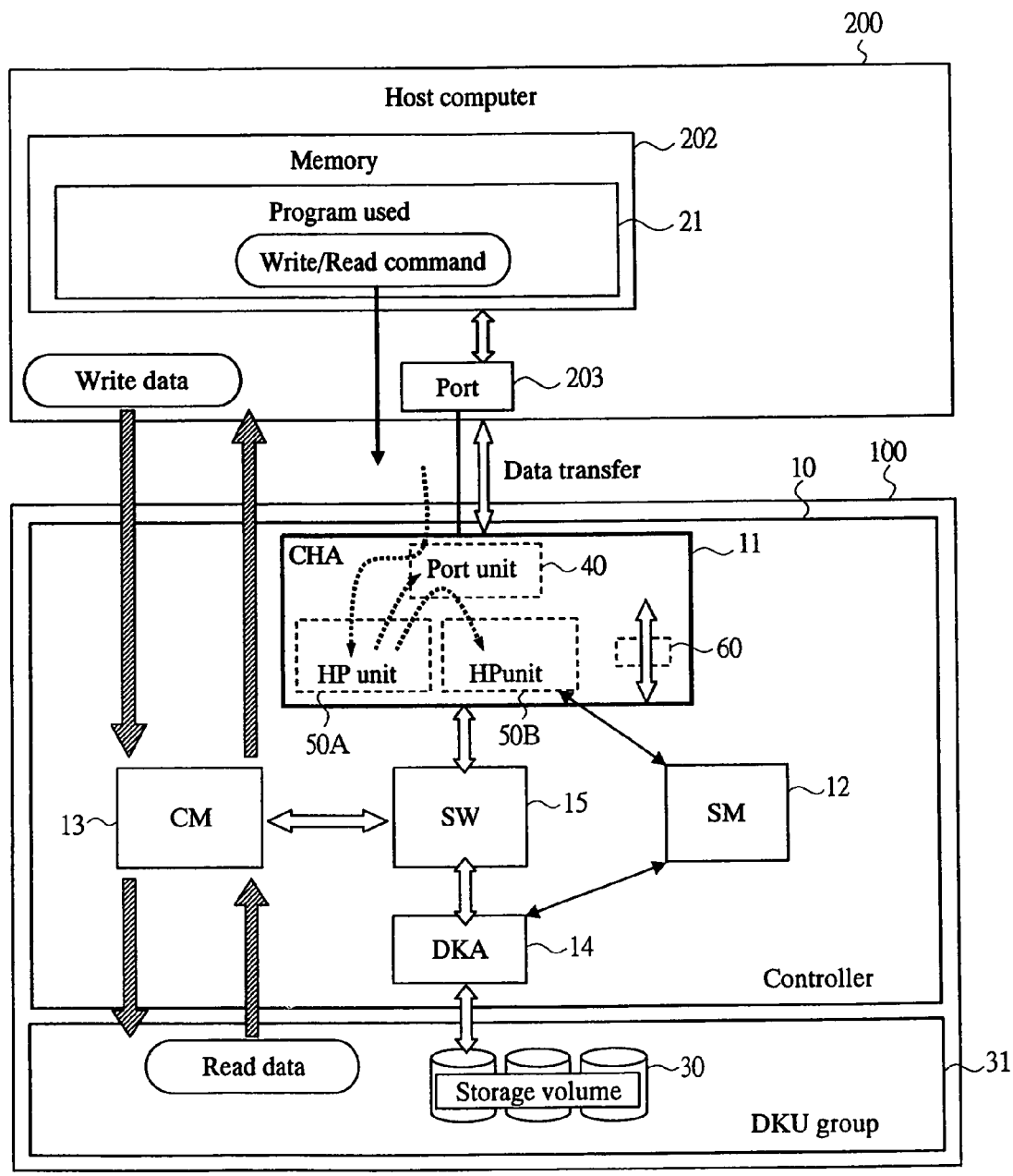
FIG. 4 is an illustration that shows the connection configuration of one host computer which is other system and one disk array system, outline of a configuration for distributing the processing cases in CHA, and a flow of commands and I/O data in a computer system including a disk array system according to the embodiment 1 of the present invention.

FIG. 4 is an illustration that indicates connection configuration of one host computer 200, which is other system 400, and one disk array system 100, general configuration for distribution of the processing in CHA 11, and a flow of commands and I/O data. Hereinafter in explaining the processing in CHA 11, the explanation will be made with other system 400 particularly assumed as a host computer 200, a host apparatus connected to the disk array system 100. CHA 11 and host 200 are connected by a fiber channel (FIBRE) interface and communication (transmission and receipt of commands and data) in compliance with the FIBRE protocol is carried out. It is possible to execute characteristic processing shown in the present embodiment by the configuration connected not only by FIBRE interface but also by various kinds of SCSI system and mainframe system interfaces in the same manner.

The utilized program 21 which the host 200 has transmits commands and I/O data to the disk array system 100 through the port 203. For example, the host 200 transmits a read command to CHA 11 directs CHA 11 to read the read data from the storage volume on HDD 30 and receives the read data as a response. In addition, the host 200 transmits a write command and write data to CHA 11, directs CHA 11 to write the write data to the storage volume on HDD 30, and receives a response. The host 200 transmits, for example, a data access request in block units, which is the data access unit on the HDD 30 side to CHA 11 of the controller 10 in the access to the storage volume in the disk array system 100.

In the controller 10, CHA 11 carries out control to transfer the data from the host 200 side to SW 15 in compliance with the communication protocol and control to transfer the data from SW 15 to the host 200 side. CHA 11 carries out processing that supports the request (command) received from other system 400. CM 13 temporarily stores the data from SW 15 by reading and writing. SM 12 stores the transfer information (control information related to data transfer) of CHA 11 and DKA 14 as well as other control information. SM 12 executes data transfer directly to multiple CHA 11 and DKA 14 without passing through SW 15 as is the case on the CM 13 side. DKA 14 carries out the control to transfer the data from the switch control adapter group 16 on the DKU side to SW 15 on the CM 13 side as well as the control to transfer the data from SW 15 on the CM 13 side to SW 15 on the DKU side. SW 15 controls in which area of CM 13 that exists in plurality should be stored in the controller 10.

The DKU group 31 is an aggregate of DKU with HDD 30 loaded, which stores various kinds of data including the data transferred from other system 400 in the storage area on the magnetic disk. The DKU group 31 is mounted and connected primarily in the HDD housing 130. The switch control adapter group 16 carries out the control to transfer the data from HDD 30 in the DKU group 31 to the DKA 14 side and the control to transfer the data from DKA 14 to the HDD 30 side, and comprises multiple switch control adapters.

In one CHA 11, there are one port unit 40 which receives requests from the host 200 side, a plurality (two) of host processor (HP) units 50 {50A, 50B} which carries out processing in response to the request, a data transfer control unit (DTC) 60 which carries out data transfer control with the CM 13 side, and others, and processing is distributed between a plurality (2) of HP unit 50. As the arrow mark in the drawing indicates, the request from the host 200 side is first received at the port unit, and the request is temporarily transferred to the HP unit (first HP unit) which serves as a representative (master) from the port unit. The first HP unit which received the request carries out judgment processing related to distribution of processing, and when the processing is distributed to other HP unit (second HP unit), the first HP unit carries out the communication for that, and the port unit transfers the request from the first HP unit to the second HP unit which serves as the processing distributed place and directs the second HP unit to carry out the processing.

<CHA Configuration>

Figure 5:
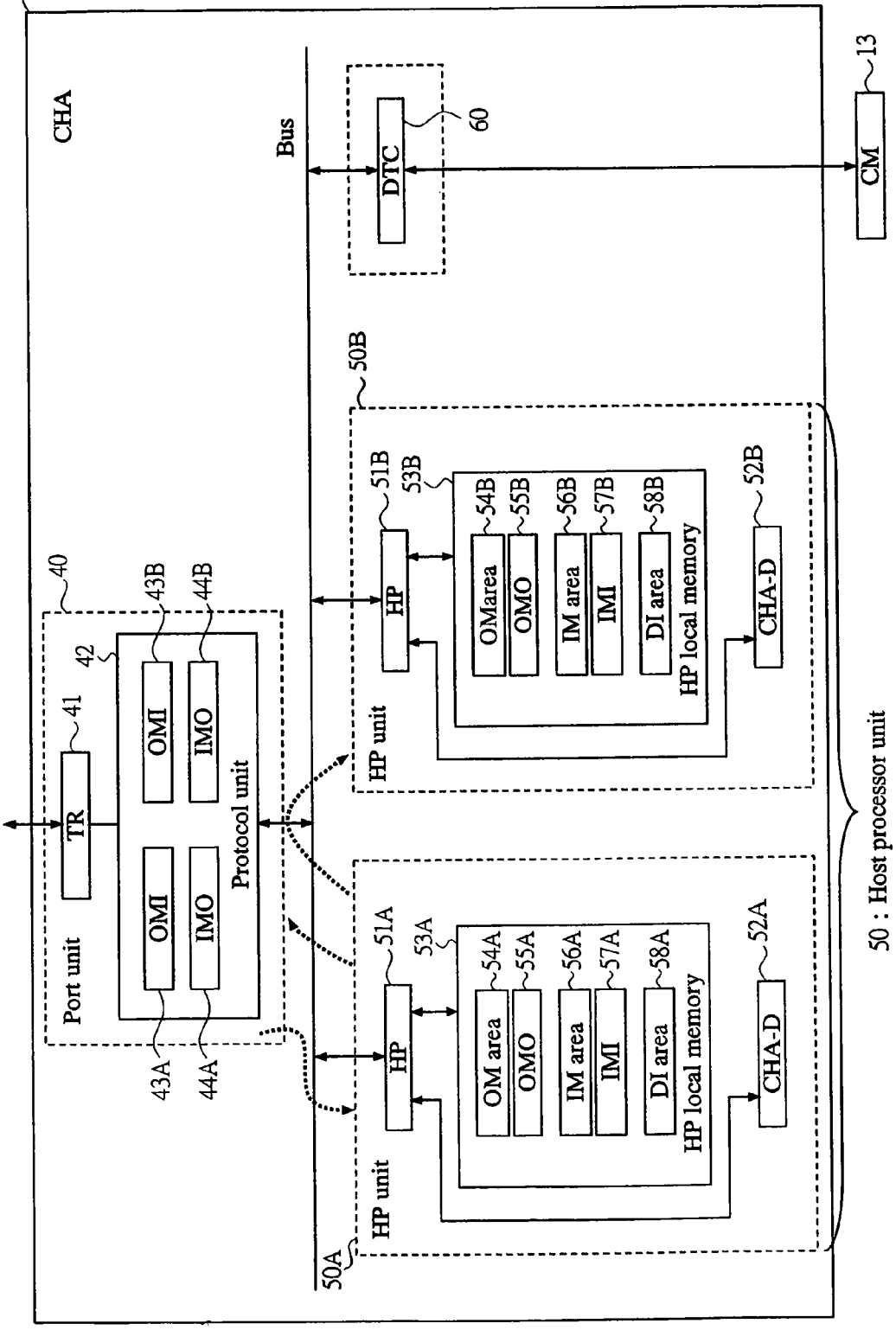
FIG. 5 is a block diagram illustrating the detailed configuration of CHA in a disk array system according to the embodiment 1 of the present invention.

FIG. 5 is a block diagram that indicates a detailed configuration of CHA 11 in the embodiment 1. CHA 11 has a configuration comprising one port unit 40, two HP units 50, data transfer control unit (DTC) 60, PCI, PCI-X, and other buses which serve as the transfer route of control information and data. In the present embodiment, a configuration which has two HP units 50, first HP unit 50A and second HP unit 50B, in CHA 11 is discussed. In the configuration, the HP unit 50A and the HP unit 50B have the same performance. In addition to this, in CHA 11, a communication cable which is connected to a connector provided in the backboard of the disk array system 100 by the connection connector not illustrated and connected to the network 300 by a communication connector not illustrated.

At CHA 11, each unit is connected via the bus. To the bus, the protocol unit 42 of the port unit 40, HP 51 of each HP unit 50, and DTC 60 are connected. On the bus, each HP unit 50 communicates with the protocol unit 42 of the port unit 40. No direct communication is carried out between HP units 50. DTC 60 communicates with the protocol unit 42 of the port unit 40. DTC 60 is connected to CM 30 via SW 15. CM 13 temporarily holds the I/O data (read-data and write data) of the host 200 side and the HDD 30 side via SW 15.

The port unit 40 is connected to the network 300 and carries out interface operation with the host 200 in compliance with the communication protocol. The port unit 40 has a configuration comprising a transceiver (TR) 41 and a protocol unit 42.

The transceiver 41 is an interface for the network 300 and is a unit which communicates with the host 200 using, for example, Shortwave and Longwave optical signals.

The protocol unit 42 controls the interface protocol with the host 200 and is an LSI with the circuit for the control formed. The protocol unit 42 carries out the data transfer operation with the host 200 via the transceiver 41 in accordance with the control from CHA drivers (52A, 52B) of each HP unit 50 and at the same time carries out data transfer with CM 13 via DTC 60, The protocol unit 42 is equipped with an area to store the control information for communication with the HP unit 50 in response to the quantity of HP unit 50 as a communication means with a plurality (2) of HP unit 50. In the relevant area, the first and the second outbound message inpointers (called OMI) 43A, 43B, first and the second inbound message outpointers (called IMO) 44A, 44B are included. At the protocol unit 42, the pointer information is stored in the area corresponding to these pointers. Meanwhile, the direction from the HP unit 50 to the port unit 40 is called outbound and the direction from the port unit 40 to the HP unit 50 inbound. OMI 43A and IMO 44A are areas for communication with the first HP unit 51A, and OMI 43B and IMO 44B are areas for communication with the second HP unit 51B.

DTC 60 is a circuit that carries out control to transfer data between the port unit 40 on the host 200 side and CM 13 in the controller 10. For example, DTC 60 carries out a control to transfer and store the write data transmitted from the host 200 from the port unit 40 side to the CM 13 area at the time of data write processing in response to the write command from the host 200. In addition, DTC 60 carries out control to read the read data from the HDD 30 side from the area of CM 13 and transmit to the port unit 40 side to transmit it to the host 200 side at the time of the data read processing in response to the read command from the host 200.

Meanwhile, it is a configuration to carry out data transfer with CM 13 as a memory to carry out data transfer and connected to DTC 60 outside CHA 11, but it may be a configuration to provide a memory connected to DTC 60 inside CHA 11 as a memory to carry out data transfer with CHA 11 connected. For example, in a configuration in which memory is connected to DTC 60 inside CHA, data transfer is carried out between the relevant memory and CM 13 in accordance with the data transfer control of DTC 60. In addition, CHA 11 is connected to SW 15, SM 12, control terminal 160, or others, but the connection section is omitted in the drawing.

The first and the second HP units 50A, 50B are processor units that control port unit 40, respectively, and comprise HP 51A, 51B, first and second CHA drivers (CHA-D in the drawing), and first and second host processor local memory (called local memory) 53A, 53B. The HP unit 50 carries out control to input and output data or commands between the host 200 side and SM 12 or CM 13 or DKA 14.

The first and the second HP 51A, 51B are processors which control the port unit 40. The first and the second HP 51A, 51B are connected to the bus, and in the HP unit 50, connected to corresponding local memory 53A, 53B and CHA driver 52A, 52B, respectively. Each of HP 51A, 51B comprises, for example, one-chip micro computer, controls transmission and receipt of the data and the command, and relays communication to the host 200 side and DKA 14 side.

The first and the second local memories 53A, 53B are memories placed inside HP unit 50, which have an area to communicate with the protocol unit 42 of the port unit 40. In the areas of the first and the second local memories 53A, 53B, various kinds of information for carrying out the control concerning communication and data transfer processing with the protocol unit 42 are written by the first and the second HP 51A, 51B and the protocol unit 42.

The first and the second CHA drivers 52A, 52B are microprograms to operate the first and the second HP 51A, 51B, and stored on nonvolatile memory. The first and the second CHA drivers 52A, 52B can be updated by writing of the microprogram from, for example, the control terminal 160. The first and the second HP 51A, 51B achieve the function as HP by executing the first and the second CHA drivers 52A, 52B. Each of CHA drivers 52A, 52B carries out the processing for controlling the protocol unit 42 of the port unit 40.

The first and the second HP units 50A, 50B have an outbound message storing areas (called OM areas) 54A, 54B, outbound message outpointers (called OMO) 55A, 55B, inbound message storing areas (called IM areas) 56A, 56B, inbound message inpointers (called IMI) 57A, 57B, data information storing areas (called DI areas) 58A, 58B, respectively, in the areas of the first and second local memories 53A, 53B as communication means with the protocol unit 42. At each local memory 53A, 53B, the pointer information is stored in the area corresponding to each pointer (55A, 55B, 57A, 57B).

In the protocol unit 42, first and second OMI 43A, 43B are areas that indicate at which position inside the first and the second OM areas 54A, 54B of HP unit 50 is located a message of the end of a plurality of outbound messages (called OM) which the first and the second CHA drivers 52A, 52B issued. The OM is the information for first and second HP 51A, 51B to direct operations to the protocol unit 42.

In addition, in the protocol unit 42, first and second IMO 44A, 44B are the areas for indicating the position of IM for which the first and the second CHA drivers 52A, 52B (HP 51A, 51B) completed processing of the multiple inbound messages (called IM) which the protocol unit 42 itself notified to the first and the second HP 51A, 51B via the first and the second IM areas 56A, 56B of the first and the second HP units 50A, 50B. The IM is the information which enables the protocol unit 42 to notify the transaction information/status information to the first and the second HP 51A, 51B.

In the first and the second local memories 53A, 53B of each HP unit 50, the first and the second OM areas 54A, 54B are areas for storing OM. To the relevant areas, multiple pieces of OM can be stored.

In the local memories 53A, 53B, the first and the second OMO 55A, 55B indicate the OM storing position inside the first and the second OM areas 54A, 54B which the protocol unit 42 processes next.

In the local memories 53A, 53B, the first and the second IM areas 56A, 56B are areas which store IM from the protocol unit 42. To the relevant areas, multiple pieces of IM can be stored.

In the local memories 53A, 53B, the first and the second IMI 57A, 57B indicate at which position in the first and the second IM areas 56A, 56B, the protocol unit 42 writes IM.

In the local memories 53A, 53B, the first and the second DI areas 58A, 58B are areas which store data information including the storing position and the transmission length of the DATA-frame transmitted and received with other system 400 in compliance with the interface protocol in CM 13.

Next description will be made on the processing operation when the read/write data is transferred with the host 200 as other system 400, in CHA 11 of the above-mentioned configuration. In the IM and OM, commands (requests) are included, but they may be handled as separate information.

<Processing at the Time of Writings

Figure 6:
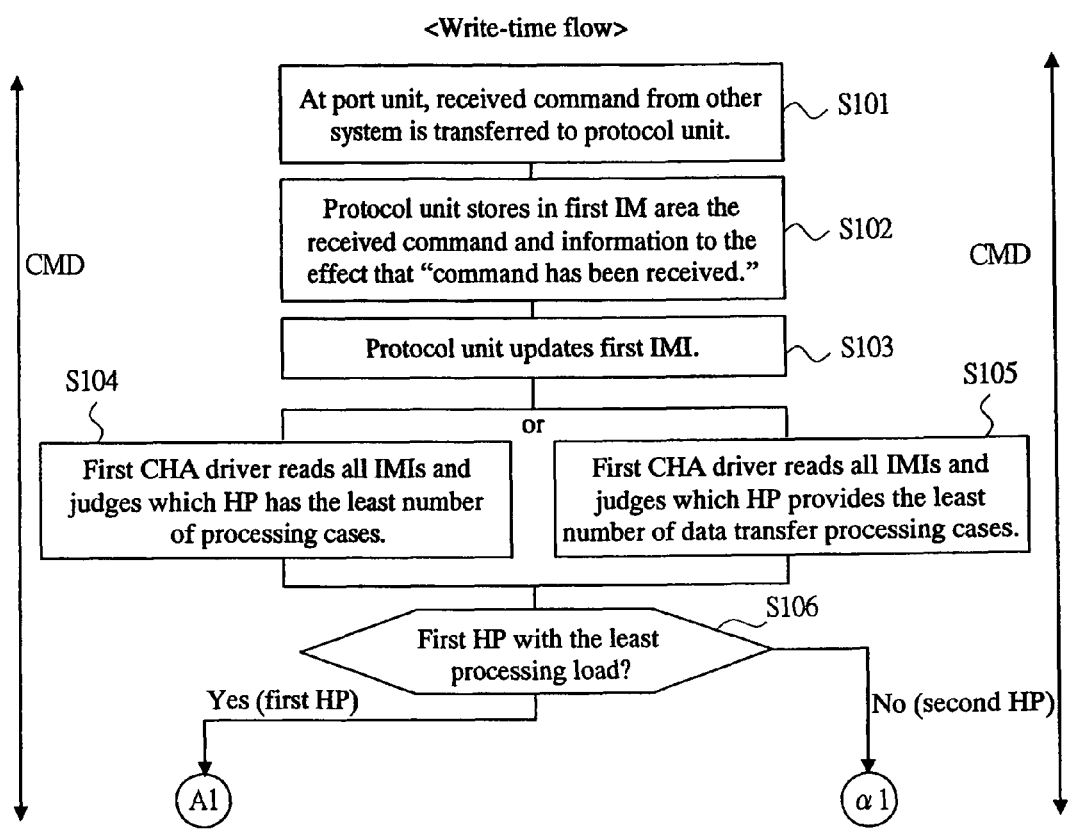
FIG. 6 is a flow chart indicating write data transferring processing in a disk array system when write data is written to HDD pursuant to a write command from a host computer (other system) in a disk array system according to the embodiment 1 of the present invention.
Figure 7:
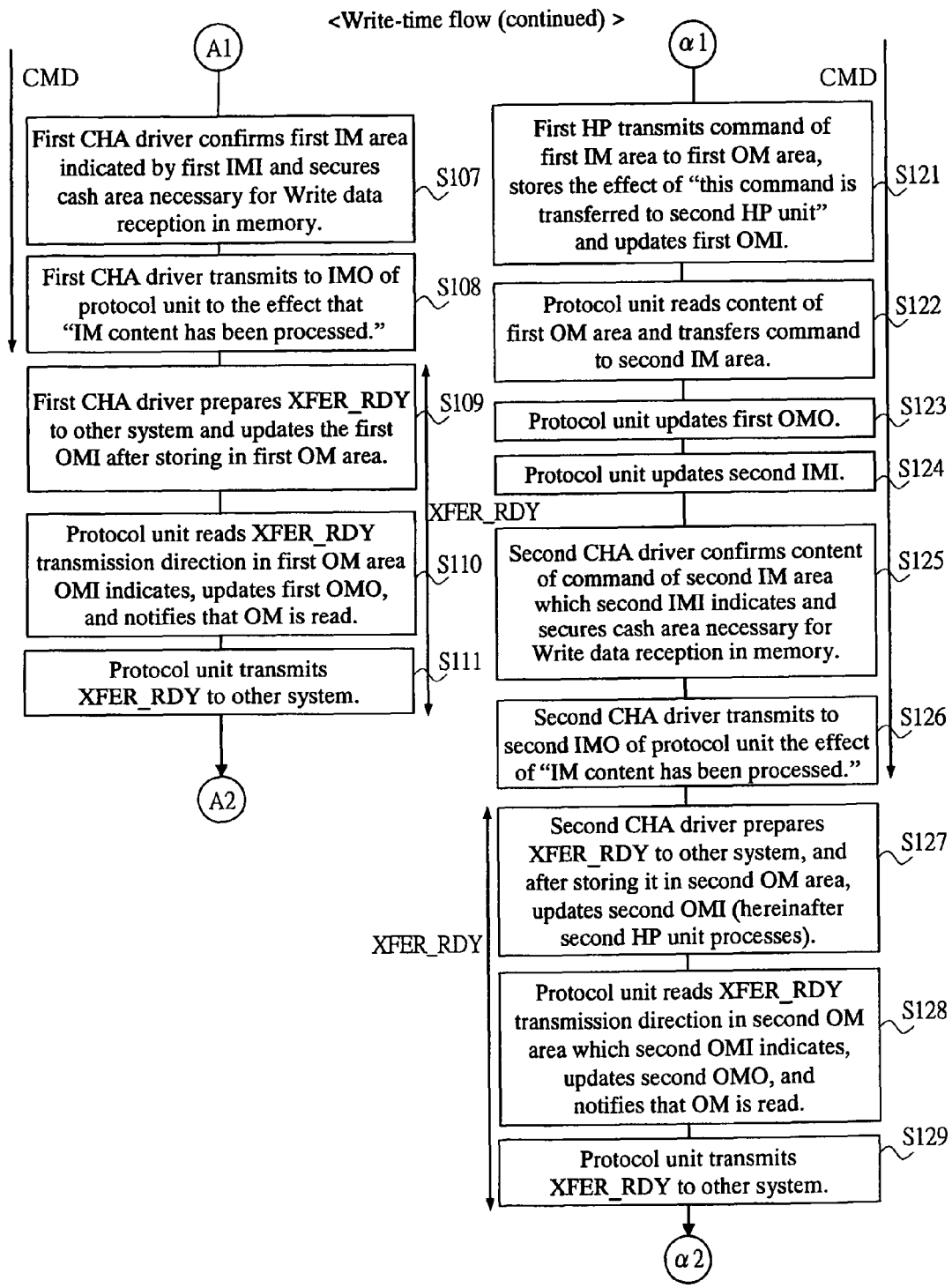
FIG. 7 is a flow chart illustrating the continuation of write data transferring processing in a disk array system according to the embodiment 1 of the present invention.
Figure 8:
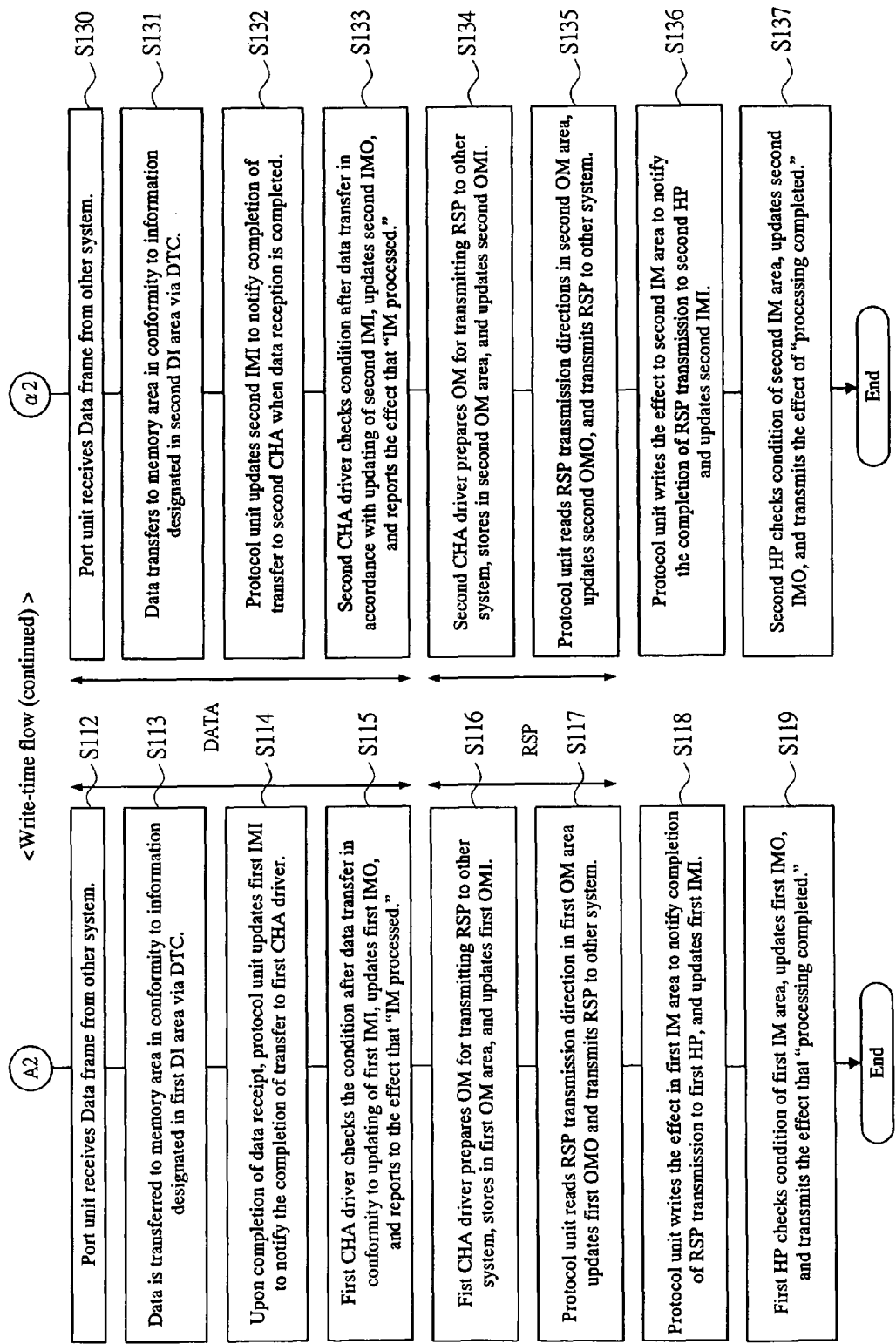
FIG. 8 is a flow chart illustrating the continuation of write data transferring processing in a disk array system according to the embodiment 1 of the present invention.

FIGS. 6, 7, and 8 are flow charts that indicate write-data transferring processing when the write data is written to HDD 30 in response to the write command from the host 200, other system 400, in the disk array system 100 of the embodiment 1. FIG. 7 shows the continuation of the processing shown in FIG. 6. FIG. 8 shows the continuation of the processing shown in FIG. 7. As an example, there shown is the processing when the first HP 51A in the first HP unit 50A is designated as a master (representative) processor which receives a request from the host 200 side for the first time in two HP units 50A, 50B in CHA 11.

In FIG. 6, after a command (write command) is received from the host 200 by the transceiver 41 of the port unit 40 of CHA 11, the received command is transferred to the protocol unit 42 of the port unit 40 (S101). Hereinafter, until HP which takes charge of the processing that supports the received command is decided, it is the phase ("CMD" in the drawing) related to the command. Next, the protocol unit 42 notifies to the first HP unit 50A, which serves as a master of multiple HP units 50 in compliance with the setting concerning the master processor. That is, the protocol unit 42 stores the received command and a message to the effect that "the command has been received" in the first IM area 56A in the first local memory 53A of the first HP unit 50A as IM (S102). The above message is, in short, the instruction information to the effect that "the received command is handled by the first HP unit 50A." And the protocol unit 42 updates the first IMI 57A in such a manner as to indicate the position as a result of storing the IM (S103).

Next, in the first HP unit 50A, based on the updating of first IMI 57A and reference of IM, judgment processing is carried out on the processing load condition at each HP unit 50 including the first HP unit 50A itself in order to decide whether the first HP unit 50A itself or other HP should be designated to take charge of the processing that supports the received command (S104 or S105). In the present embodiment, two types of judgment processing are indicated with respect to the processing load condition of each HP 51A and 51B. In the first judgment processing, the number of processing in charge in each HP 51A, 51B in CHA 11 is designated as the judgment factor. In the second judgment processing, the processing volume (rough) in each HP 51A, 51B in CHA 11 is designated as the judgment factor. The first CHA driver 52A of the first HP unit 50A carries out either of the first or the second judgment processing.

In the first judgment processing, the first CHA driver 52A reads all the IMI 57A, 57B in multiple HP units 50 and judges which HP can carry out the processing by the least number of processings (S104). That is, the first CHA driver 52A recognizes the number of IMs stored in the corresponding IM areas 56A, 56B by reading the IMI 57A, 57B and recognizes the number of processings (number of processings in charge) which each HP 51A, 51B must carry out. By this, the processing load of each HP 51A, 51B is roughly grasped.

In the second judgment processing, the first CHA driver 52A reads all the IM areas 56A, 56B in multiple HP units 50 and judges which HP provides the least data transfer processing (S105). The first CHA driver 52 roughly recognizes the processing amount in the data transfer processing corresponding to the received commands and IMs in storage (when a plurality of IMs exist, a total of a plurality of corresponding processing) by reading the IM areas 56A, 56B, and roughly grasps the processing load at each HP. For example, the first CHA driver 52A finds the processing volume required in the data transfer processing from the information on the data size, data transfer frequency, and others included in the received command by a simple calculation.

Next, in the event that based on the judgment processing, the HP unit whose processing load is judged the smallest of multiple HP units 50 is the first HP unit 50A itself (S106-YES-A1), the first CHA driver 52A of the first HP unit 50A itself decides to take charge of processing of the received command and carries out the processing of S107 and after. In addition, in the event that the HP unit whose processing load is judged the smallest of multiple HP units 50 is not the first HP unit 50A but other HP unit, that is, the second HP unit 50B (S106-NO-α1), the first CHA driver 52A of the first HP unit 50A decides to assign the second HP unit 50B the processing of the received command and carries out processing of S121 and after. Because the embodiment 1 has a configuration to have two HP units 50, the other HP unit in charge to which the processing is transferred is the second HP unit 50B. In the event that there are multiple HP sections 50 as other objected HP units as described later, the HP unit with the least load of all will be chosen.

In A1 of FIG. 7, in the event that the first HP unit 50A takes charge of the processing, the first CHA driver 52A confirms the content of IM (received command and information) stored in the first IM area 56A which the first IMI 57A indicates, and secures the cache area necessary for receiving the write data from the host 200 in CM 13 in accordance with the command content (S107).

Next, the first CHA driver 52A transmits the notice information to the effect that "IM content has been processed" to the first IMO 44A of the protocol unit 42 of the port unit 40 (S108). By this notice information, the position of the IM which the first CHA driver 52 processed is shown to the first IMO 44A. Thereafter, the processing moves to the phase in which the data transfer is ready ("XFER_RDY" in the drawing).

Now, the first CHA driver 52A prepares XFER_RDY (transfer ready: information that indicates that the preparation of data transfer is ready) to the host 200 and stores it as OM in the first OM area 54A, and updates the first OMI 43A of the protocol unit 42 of the port unit 40 (S109). This update is carried out to notify the XFER_RDY transmission indication to the protocol unit 42.

Then, the protocol unit 42 of the port unit 40 reads the XFER_RDY transmission direction located in the first OM area 54A in the first HP unit 50A which the updated first OMI 43A indicates and updates the first OMO 55A to notify the first HP 50A that OM (the transmission direction) is read (S110).

Then, the protocol unit 42 transmits XFER_RDY to the host 200 in accordance with the transmission direction (S111-A2). After that, processing moves to the phase ("DATA" in the drawing) in which data transfer is carried out.

In A2 of FIG. 8, in the phase to carry out data transfer, the port unit 40 receives a data frame from the host 200 (S112). The received data frame is transferred to the protocol unit 42. Then, the protocol unit 42 carries out processing for transferring the received data frame to the area secured as the cache area in CM 13 in accordance with the data storing place information (address, transfer length, and other information) designated by the first DI area 58A in the first HP unit 50A via the control at DTC 60 (S113).

Then, the protocol unit 42 updates the first IMI 57A in the first local memory 53A in order to notify the data transfer completion to the first CHA driver 52A of the first HP unit 50A upon completion of receiving the data frame from the host 200 (S114).

Next, the first CHA driver 52A of the first HP unit 50A checks the condition after the data is transferred to CM 13 in accordance with the update of the first IMI 57A, and reports the effect of "IM has been processed" by updating the first IMO 44A of the protocol unit 42 (S115). By this report, "data transfer processing that supports the received command (transfer of the received data frame to CM 13) has been completed" is recognized by the protocol unit 42. Thereafter, the processing moves to the phase ("RSP" in the drawing) in which a response to the host 200 is made.

Now, the first CHA driver 52A prepares the information (RSP transmission direction) to transmit the frame (RSP) of response to the host 200 as OM, stores in the first OM area 54A, and updates the first OMI 43A of the protocol unit 42 for this notice (S116).

Next, the protocol unit 42 reads the RSP transmission direction in the first OM area 54A of the first HP unit 50A in accordance with the update of the first OMI 43A and updates the first OMO 55A. And based on the transmission direction, the protocol unit 42 transmits RSP to the host 200 (S117).

Then, the protocol unit 42 writes the effect of "Completion of RSP transmission" as IM in the first IM area 56A in the first HP unit 50A to notify the RSP transmission completion to the first HP 51A, and updates the first IMI 57A (S118).

Next, the first HP 51A of the first HP unit 50A checks the data transfer completion condition by IM stored in the first IM area 56A in accordance with the update of the first IMI 57A, and when it confirms the "Completion of RSP transmission", transmits the effect of "processing for the command has been completed" to the protocol unit 42 by updating the first IMO 44A of the protocol unit 42 (S119).

On the other hand, in the case of α1 of FIG. 7 in which the second HP unit 50B takes charge of the processing, first of all, the first HP 51A of the first HP unit 50A transfers the command stored in the first IM area 56A in the first local memory 53A to the first OM area 54, and at the same time, stores the direction information to the effect of "this command is transferred to the second HP unit 50B" as OM, and updates the first OMI 43A of the protocol unit 42 to notify this (S121).

Then, the protocol unit 42 reads the content of the first OM area 54A (the command and the direction information) of the first HP unit 50A in accordance with the update of the first OMI 43A, and transfers the command to the second IM area 56B in the second local memory 53B of the second HP unit 50B (S122).

Then, the protocol unit 42 updates the first OMO 55A of the first HP unit 50A as a result of the transfer of the command (S123). Next, the protocol unit 42 updates the second IMI 57B to indicate the position of the command stored in the second IM area 56B of the second HP unit 50B as a result of the transfer of the command (S124).

Next, the second CHA driver 52B of the second HP unit 50B confirms the content of the command stored in the second IM area 56B which the second IMI 57B indicates, and secures a caches area necessary for receiving the write data from the host 200 in CM 13 (S125).

Then, the second CHA driver 52B transmits and stores the notice information to the effect that "IM content has been processed" to the second IMO 44B of the protocol unit 42 (S126). By this notice information, the position of the IM which the second CHA driver 52B processed is indicated in the second IMO 44B. Thereafter, the processing moves to the phase ("XFER_RDY" in the drawing) in which preparation of the data transfer is finished.

Thereafter, the second HP unit 50B carries out the processing (S127-S137) same as the processing (S109-S119) by the first HP unit 50A with the port unit 40. The second CHA driver 52B prepares XFER_RDY to the host 200 and stores it in the second OM area 54B; then, it updates the second OMI 43B of the protocol unit 42 (S127).

Next, the protocol unit 42 of the port unit 40 reads the XFER_RDY transmission direction located at the position inside the second OM area 54B in the second HP unit 50B which the updated second OMI 43B indicates and notifies to the second HP 51B that the message (the transmission direction) has been read by updating the second OMO 55B (S128).

Next, the protocol unit 42 transmits XFER_RDY to the host 200 in accordance with the transmission direction (S129-α2). Thereafter, the processing moves to the phase ("DATA" in the drawing) in which the data transmission is carried out.

In α2 of FIG. 8, in the phase of carrying out the data transmission, the port unit 40 receives the data frame from the host 200 (S130). The received data frame is transferred to the protocol unit 42. Then, the protocol unit 42 carries out the processing for transferring the received data frame to the area inside CM 13 in accordance with the data storing location information designated by the second DI area 58B in the second HP unit 50B via the control at DTC 60 (S131).

Next, the protocol unit 42 updates the second IMI 57B in order to notify the data transmission completion to the second CHA driver 52B when the reception of the data frame from the host 200 is completed (S132).

Then, the second CHA driver 52B reports that "IM has been processed" by updating the second IMO 44B of the protocol unit 42 after it checks the condition after the data is transferred to CM 13 in accordance with the updating of the second IMI 57B (S133). Thereafter, the processing moves to the phase ("RSP" in the drawing) in which a response to the host 200 is carried out.

Next, the second CHA driver 52B prepares the information (RSP transmission direction) to transmit the response frame (RSP) to the host 200 as OM, stores in the second OM area 54B, and updates the second OMI 43B of the protocol unit 42 for the notice (S134).

Next, the protocol unit 42 reads the RSP transmission direction in the second OM area 54B of the second HP unit 50B in accordance with the updating of the second OMI 43B and updates the second OMO 55B. And based on the transmission direction, the protocol unit 42 transmits RSP to the host 200 (S135).

Then, the protocol unit 42 writes the effect of "completion of RSP transmission" to the second IM area 56B as IM to notify the second HP 51B of the completion of RSP transmission and updates the second IMI 57B (S136).

Then, the second HP 51B checks the data transmission completion condition by IM stored in the second IM area 56B in accordance with the updating of the second IMI 57B, and confirms the "RSP transmission completion," and by updating the second IMO 44B of the protocol unit 42, the second HP 51B transmits the effect of "processing that supports the command has been completed" to the protocol unit 42 (S137).

<Processing at the Time of Reading>

Figure 9:
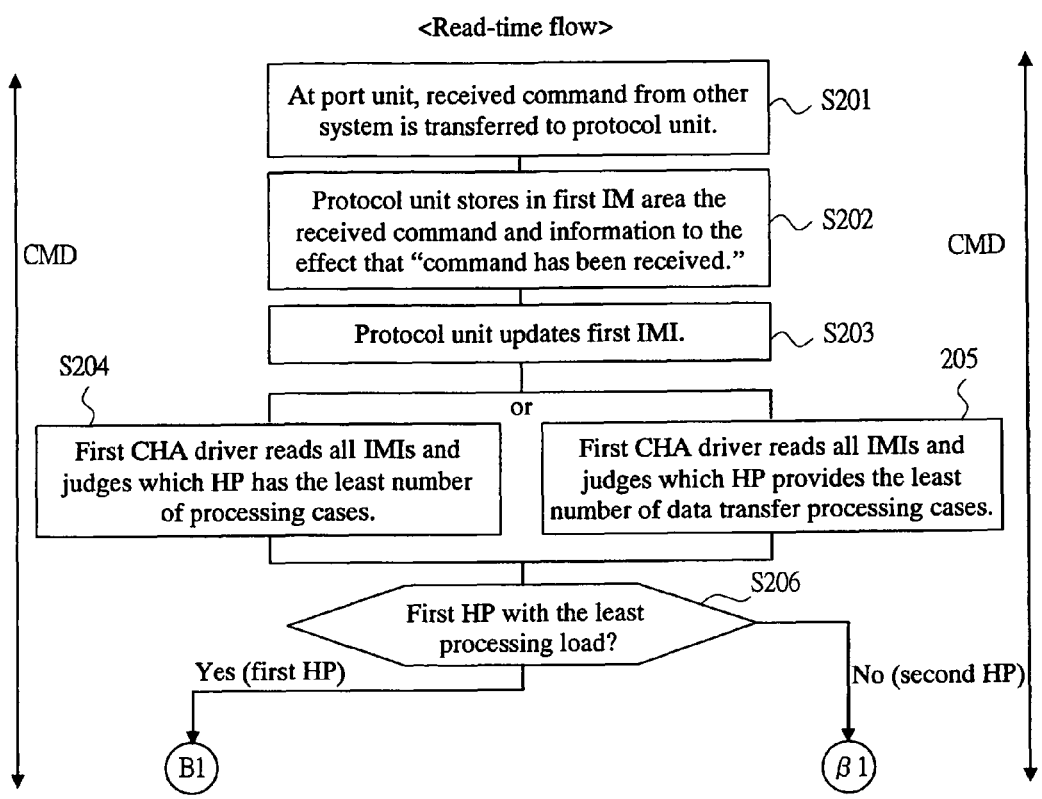
FIG. 9 is a flow chart that indicates read data transferring processing in a disk array system when the read data is transferred from HDD to a host computer pursuant to the read command from a host computer (other system), according to the embodiment 1 of the present invention.
Figure 10:
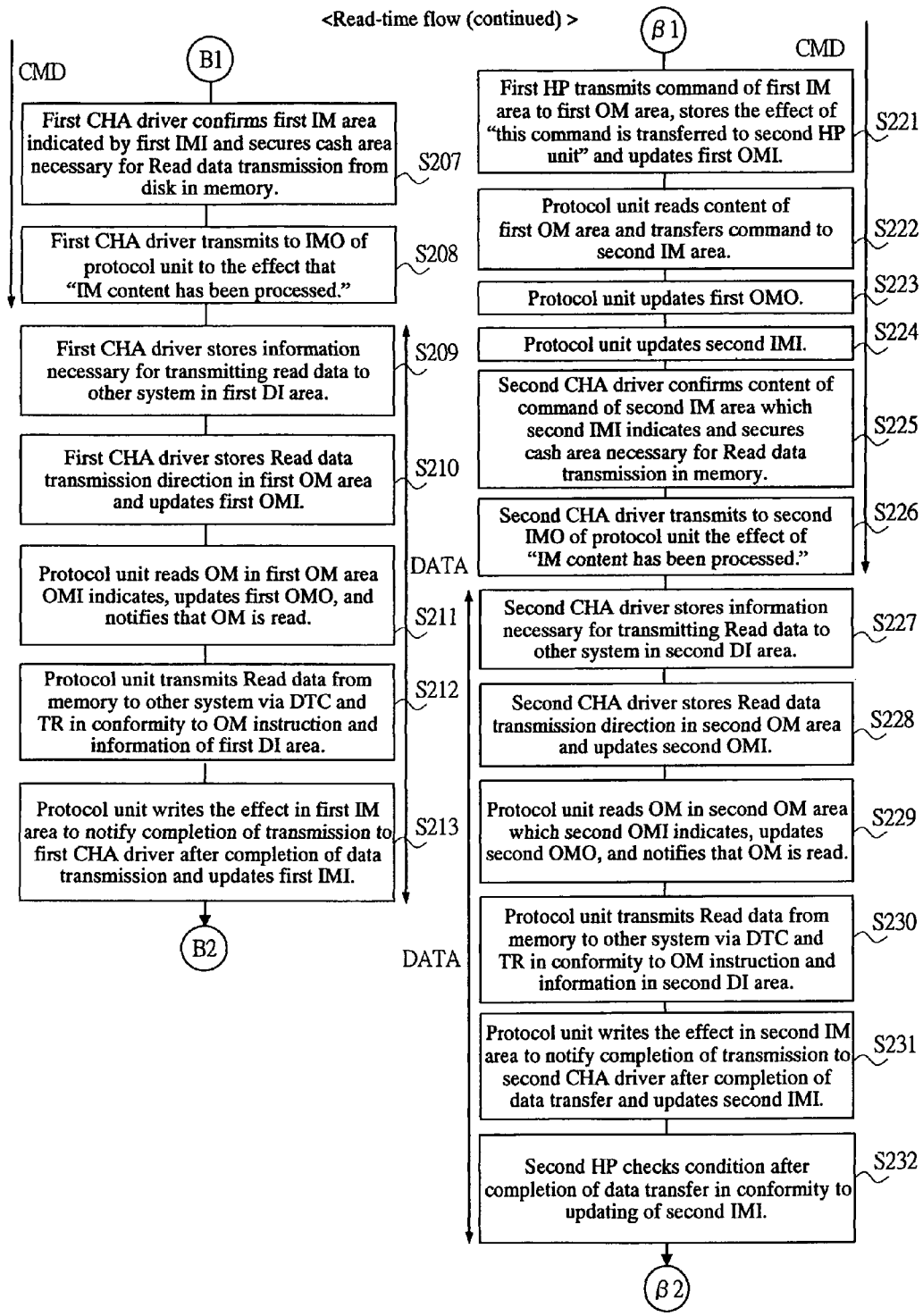
FIG. 10 is a flow chart that indicates the continuation of read data transferring process in a disk array system according to the embodiment 1 of the present invention.
Figure 11:
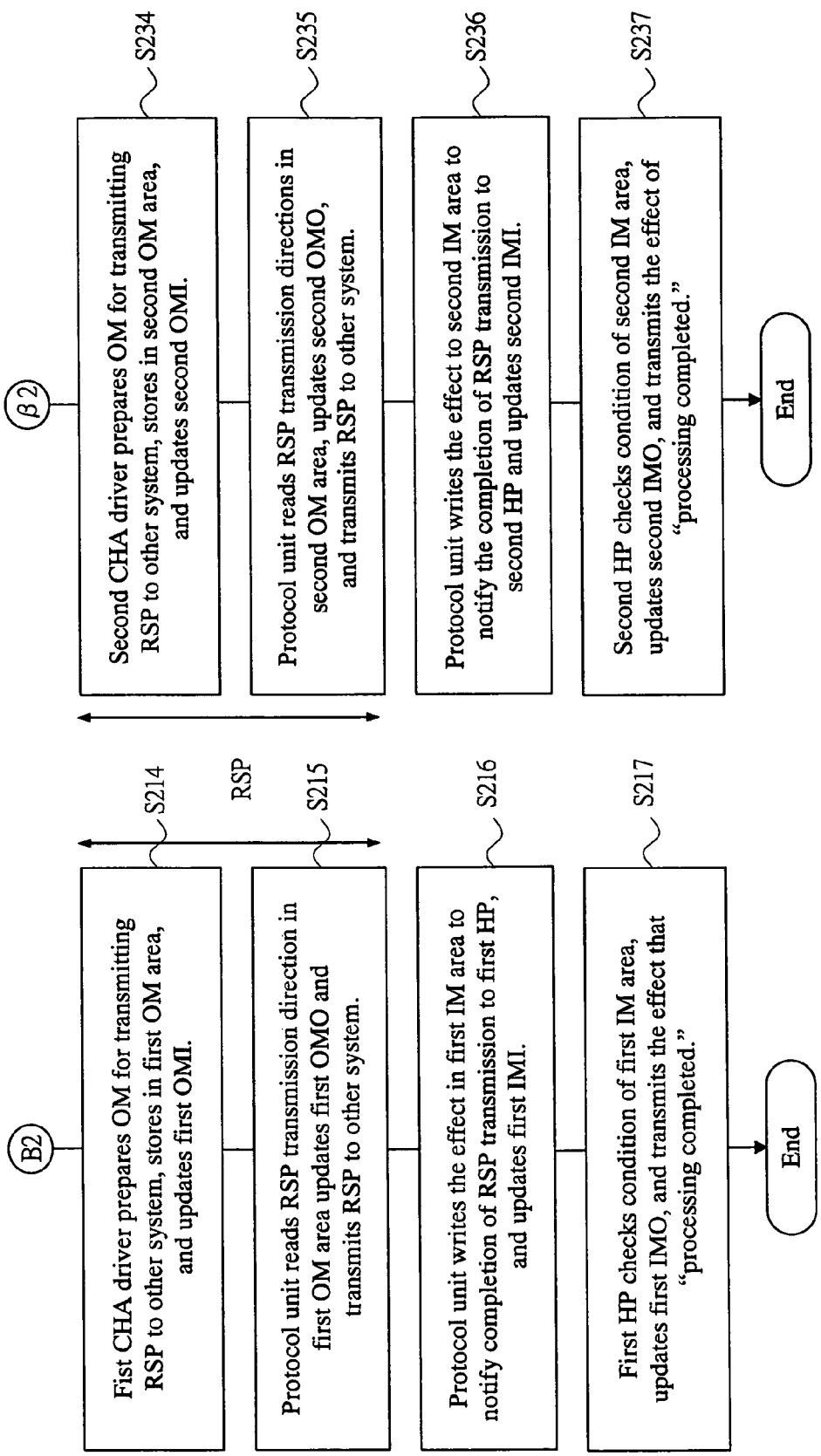
FIG. 11 is a flow chart that indicates the continuation of read data transferring process in a disk array system according to the embodiment 1 of the present invention.

FIGS. 9, 10, and 11 are flow charts illustrating the read data transfer processing when read data from HDD 30 (disk) to host 200 in response to a read command from the host 200, which is other system 400, in the disk array system according to the embodiment 1. FIG. 10 shows a continuation of processing shown in FIG. 9. FIG. 11 shows a continuation of processing shown in FIG. 10. In the case of processing at the time of this reading, the phase (former "XFER_RDY") of the data transfer being prepared shown in the former processing at the time of writing does not exist. As an example, same as the case of writing, there shown is the processing when the first HP 51A in the first HP unit 50A in two HP units 50 in CHA 11 is designated as the master (representative) processor which receives a request for the first time.

In FIG. 9, after receiving a command (read command) from the host 200 by the transceiver 41 of the port unit 40 of CHA 11, the received command is transferred to the protocol unit 42 of the port unit 40 (S201). Thereafter, it is a phase ("CMD" in the drawing) related to the command until HP which takes charge of processing that supports the received command is decided. Next, the protocol unit 42 notifies the first HP unit 50A, which serves as a master of multiple HP units 50, in accordance with the setting related to the master processor. That is, the protocol unit 42 stores the received command and a message to the effect of "command has been received" in the first IM area 56A in the first local memory 53A of the first HP unit 50A as IM (S202). The above message is, in short, the instruction information to the effect that "the received command is handled by the first HP unit 50A." And the protocol unit 42 updates the first IMI 57A in such a manner as to indicate the position as a result of storing the IM (S203).

Next, in the first HP unit 50A, same as the judgment former processing at the time of writing, based on the updating of first IMI 57A and reference of IM, judgment processing is carried out on the processing load condition at each HP unit 50A, 50B in order to decide whether the first HP unit 50A itself or other HP should be designated to take charge of the processing (S204 or S205). The first CHA driver 52A carries out either first or second judgment processing. In the first judgment processing, the first CHA driver 52A reads all the IMI 57A, 57B in multiple HP units 50 and judges which HP can carry out the processing by the least number of processings (S204). In the second judgment processing, the first CHA driver 52A reads all the IM areas 56 in multiple HP units 50 and judges which HP provides the least data transfer processing (S205).

Next, in the event that based on the judgment processing, the HP unit whose processing load is judged the smallest of multiple HP units 50 is the first HP unit 50A itself (S206-YES-B1), the first CHA driver 52A of the first HP unit 50A itself decides to take charge of processing of the received command and carries out the processing of S207 and after. In addition, in the event that the HP unit whose processing load is judged the smallest of multiple HP units 50 is not the first HP unit 50A but other HP unit, that is, the second HP unit 50B (S206-NO-β1), the first CHA driver 52A of the first HP unit 50A decides to assign the second HP unit 50B the processing of the received command and carries out processing of S221 and after.

In B1 of FIG. 10, in the event that the first HP unit 50A takes charge of the processing, the first CHA driver 52A confirms the content of IM (received command and information) stored in the first IM area 56B which the first IMI 57A indicates, and secures the cache area necessary for transmitting the read data from the disk in CM 13 in accordance with the command content (S207).

Next, the first CHA driver 52A transmits the notice information to the effect that "IM content has been processed" to the first IMO 44A of the protocol unit 42 of the port unit 40 (S208). By this notice information, the position of the IM which the first CHA driver 52A processed is shown to the first IMO 44A. Thereafter, the processing moves to the phase ("DATA" in the drawing) in which data transfer is carried out.

Now, the first CHA driver 52A stores the information necessary for transmitting the read data to the host 200 in the first DI area 58A (S209).

Next, the first CHA driver 52A stores the read data transmission direction in the first OM area 54A as OM and updates the first OMI 43A of the protocol unit 42 to notify this (S210).

Then, the protocol unit 42 of the port unit 40 reads OM located in the first OM area 54A in the first HP unit 50A which the updated first OMI 43A indicates and updates the first OMO 55A to notify the first HP 51A that OM (the transmission direction) has been read (S211).

Then, the protocol unit 42 transfers and transmits the read data from CM 13 to the host 200 via DTC 60 and transceiver 41 in accordance with the read-data transmission direction in the read OM and the information stored in the first DI area 58A of the first HP unit 50A (S212).

Then, the protocol unit 42 writes the data transfer completion as IM in the first IM area 56A for its notice to the first CHA driver 52A of the first HP unit 50A and simultaneously updates the first IMI 57A after the transmission to the host 200 of the read data specified by the information of the first DI area 58A is completed (S213). Thereafter, processing moves to the phase in which a response to the host 200 is made (B2, "RSP" in the drawing).

In B2 of FIG. 11, in the phase to carry out the response, the first HP unit 50A carries out the same processing as that at the time of writing. The first CHA driver 52A prepares the information (RSP transmission direction) to transmit the frame (RSP) of response to the host 200 as OM, stores in the first OM area 54A, and updates the first OMI 43A of the protocol unit 42 for this notice (S214).

Next, the protocol unit 42 reads the RSP transmission direction in the first OM area 54A of the first HP unit 50A in accordance with the update of the first OMI 43A and updates the first OMO 55A. And based on the transmission direction, the protocol unit 42 transmits RSP to the host 200 (S215).

Then, the protocol unit 42 writes the effect of "Completion of RSP transmission" as IM in the first IM area 56A in the first HP unit 50A to notify the RSP transmission completion to the first HP 51A, and updates the first IMI 57A (S216).

Next, the first HP 51A of the first HP unit 50A checks the data transfer completion condition by IM stored in the first IM area 56A, and when it confirms the "Completion of RSP transmission", transmits the effect of "processing for the command has been completed" to the protocol unit 42 by updating the first IMO 44A of the protocol unit 42 (S217).

On the other hand, in the case of β1 of FIG. 10 in which the second HP unit 50B takes charge of the processing, same as the processing at the time of writing, processing in the phase related to the command is carried out. First of all, the first HP 51A of the first HP unit 50A transfers the command stored in the first IM area 56A in the first local memory 53A to the first OM area 54A, and at the same time, stores the direction information to the effect of "this command is transferred to the second HP unit 50B" as OM, and updates the first OMI 43A of the protocol unit 42 to notify this (S221).

Then, the protocol unit 42 reads the content of the first OM area 54A (the command and the direction information) of the first HP unit 50A in accordance with the update of the first OMI 43A, and transfers the command to the second IM area 56B in the second local memory 53B of the second HP unit 50B (S222).

Then, the protocol unit 42 updates the first OMO 55A of the first HP unit 50A as a result of the transfer of the command (S223). Next, the protocol unit 42 updates the second IMI 57B to indicate the position of the command stored in the second IM area 56B of the second HP unit 50B as a result of the transfer of the command (S224).

Next, the second CHA driver 52B of the second HP unit 50B confirms the content of the command stored in the second IM area 56B which the second IMI 57B indicates, and secures a cache area necessary for transmitting the read data from the disk to the host 200 (S225).

Then, the second CHA driver 52B transmits and stores the notice information to the effect that "IM content has been processed" to the second IMO 44B of the protocol unit 42 (S226). By this notice information, the position of the IM which the second CHA driver 52B processed is indicated in the second IMO 44B. Thereafter, the processing moves to the phase ("DATA" in the drawing) in which the data transmission is carried out.

In the phase of carrying out data transfer, the second HP unit 50B carries out the processing (S227-S232) related to data transfer same as write processing.

The second CHA driver 52B stores the information necessary for transmitting the read data in the second DI area 58B (S227).

Then the second CHA driver 52B stores the read data transmission direction in the second OM area 54B as OM and updates the second OMI 43B of the protocol unit 42 to notify this (S228).

Then, the protocol unit 42 of the port unit 40 reads OM located in the second OM area 54B in the second HP unit 50B which the updated second OMI 43B indicates and updates the second OMO 55B to notify the second HP 51B that OM (the transmission direction) has been read (S229).

Then, the protocol unit 42 transfers and transmits the read data from CM 13 to the host 200 via DTC 60 and transceiver 41 in accordance with the read-data transmission direction in the read OM and the information stored in the second DI area 58B of the second HP unit 50B (S230).

Then, the protocol unit 42 writes the data transfer completion as IM in the second IM area 56B for its notice to the second CHA driver 52B of the second HP unit 50B and simultaneously updates the second IMI 57B after the transmission to the host 200 of the read data specified by the information of the second DI area 58B is completed (S231). Thereafter, processing moves to the phase in which a response to the host 200 is made ("RSP" in the drawing).

Next, the second HP 51B of the second HP unit 50B checks the condition of data transfer stored in the second IM area 56B in accordance with the update of the second IMI 57B, and when it confirms the completion of data transfer, it transmits the effect of "IM content has been processed" by updating the second IMO 44B of the protocol unit 42 (S232).

In β2 of FIG. 11, in the phase to carry out the response, the second HP unit 50B carries out the same processing as that by the first HP unit 50A (S234-S237). The second CHA driver 52B prepares the information to transmit the frame (RSP) of response to the host 200 (RSP transmission direction) as OM, stores in the second OM area 54B, and updates the second OMI 43B of the protocol unit 42 for this notice (S234).

Next, the protocol unit 42 reads the RSP transmission direction in the first OM area 54B of the second HP unit 50B in accordance with the update of the second OMI 43B and updates the first OMO 55B. And based on the transmission direction, the protocol unit 42 transmits RSP to the host 200 (S235).

Then, the protocol unit 42 writes the effect of "Completion of RSP transmission" as IM in the second IM area 56B in the second HP unit 50B to notify the RSP transmission completion to the second HP 51B, and updates the second IMI 57B (S236).

Next, the second HP 51B of the second HP unit 50B checks the data transfer completion condition by IM stored in the second IM area 56B, and when it confirms the "Completion of RSP transmission", transmits the effect of "processing for the command has been completed" to the protocol unit 42 by updating the second IMO 57B (S237). This concludes the processing flow.

As described above, in the present embodiment, other system 400 can recognize the response to its request as a response from the same access target without depending on HP which responds on the disk array system 100 side by distributing each of the processing that supports the request (command) from other system 400 such as host 200 and others between multiple (two) HP units 50 via the protocol unit 42 of the port unit 40.

In the present embodiment, which HP should carry out certain processing that supports a command from other system 400 is not uniquely decided by a predetermined setting but is decided among multiple HPs without partially applying loads to specific HPs in accordance with the judgment of the processing load condition of the first HP unit 50A which serves as master (representative) and other HP unit (second HP 50B) each time a command is received. Consequently, the present embodiment is free of lowered processing efficiency as is the case of conventional configuration (system to decide the place to which processing is distributed based on table information) where processors in charge of the processing are partialized in some cases, and operation can be carried out efficiently.

In addition, in the present embodiment, when charges of processing is shifted from one processor (first HP 51A) to other processor (second HP 51B), the information is temporarily read by the protocol unit 42 of the port unit 40 and then, the command is transferred from the protocol unit 42 to the processor (second HP 51B) which takes charge of the processing and the charge is assigned to the other processor. Consequently, as is the case of the conventional configuration (a command is directly transferred among multiple processors and processing is distributed), processors (HP 51A, 51B) do not need to have a function to directly communicate each other between processors, and the distribution of processing can be achieved with a comparatively simple and inexpensive configuration.

Now modified examples are described for the present embodiment. First of all, in the above-mentioned configuration, the first HP 51A that serves as the master (representative) is fixedly decided in accordance with the setting of the protocol unit 42 of the port unit 40, but the master HP may be varied between multiple HP 50s in CHA 11. That is, in the port unit 40, the specified conditions which serve as a criterion to decide a master HP are established, and when a command is received, HP which serves as a master is decided in accordance with the relevant criterion. The processing after that is the same.

In addition, in the above-mentioned configuration, in the first HP 51A (CHA driver 52A) which serves as the master, for the judgment processing, the processing load condition in all the HPs in CHA 11 are judged and the HP which takes charge of processing is decided, but such a processing form may be adopted that in the first HP 51A, first of all, the processing load condition of the first HP 51A itself is judged, and in the event that it has a specified allowance for executing the processing, the first HP 51A shall take charge of the processing, and in the event that it has no specified allowance, judgment and shifting processing to shift the charge to other HP may be carried out newly. For example, whether the number of processings in charge is less than the specified number or the processing amount is less than the specified amount is recognized at the first HP 51A and whether or not there is the specified allowance is judged. In addition to the control carried out to distribute the processing to achieve uniform number of processings in charge or uniform processing amount at each HP, a form to control to intentionally partialize processing to the first HP unit 50A which serves as a master to a specified level by setting the load judgment conditions.

Furthermore, in the above-mentioned configuration, there adopted is a processing form to allow the first HP 51A to read the IM areas 56A, 56B or IMI 57A, 57B in each HP unit and judge the condition in the judgment processing, but such a processing form may be adopted as to provide a table which holds a list of processing load condition or processing charge condition in each HP at the position accessible from multiple HPs including the first HP 51A in CHA 11, and refer to the table at the time of judgment processing. For example, an area of a table that holds the list on the memory connected to the bus is provided in CHA 11. And processing such as updating the table information when the HP to carry out the processing is decided is performed.

In addition, in the event that execution of processing is denied because some trouble occurs at any HP unit of the multiple HP units 50 in the above configuration, efficient processing can be continued by judging and controlling to allow HP units other than that in trouble to take charge of the processing.

Furthermore, in the above configuration, it is possible to have a form in which a plurality of configuration unit comprising one port unit 40 and multiple HP units 50 may be provided in CHA 11. In each configuration unit, the same distribution of processing takes place.

In addition, it is possible to have a redundancy configuration by multiplexing the portion of the controller 10 in the above configuration. By the multiplexing configuration, the paths for communication between other system 400 and controller 10 and HDD 30 are multiplexed. Distribution of processing in the CHA 11 is carried out in the same manner independently for each controller 10.

Embodiment 2

Figure 12:
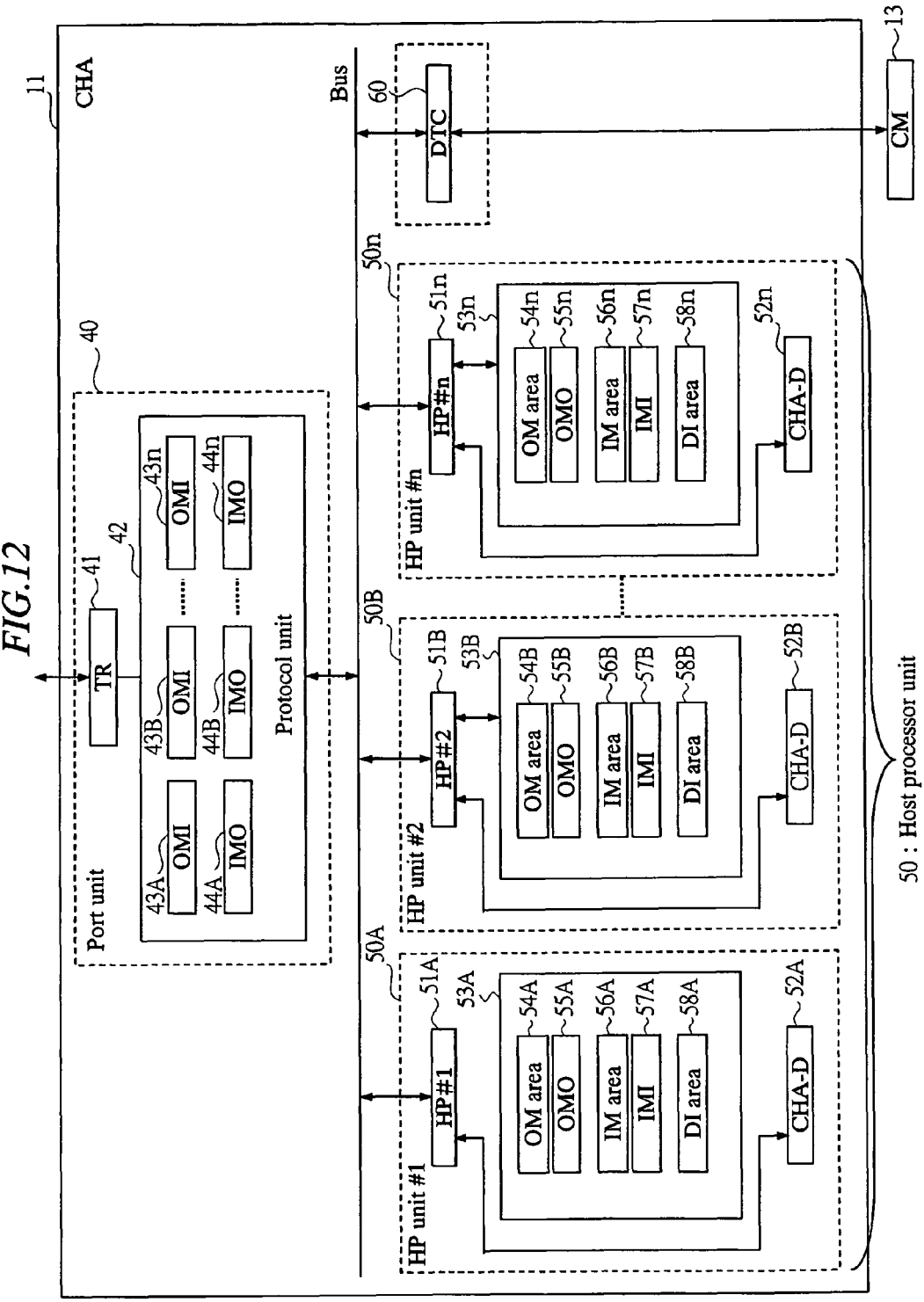
FIG. 12 illustrates the functional block configuration of CHA in a disk array system according to embodiment 2 of the present invention.

Now, description will be made on a disk array system according to embodiment 2. FIG. 12 indicates one functional block configuration of CHA 11 in the disk array system according to the embodiment 2. In the embodiment 2, three or more (n pieces of) HP 50 units (HP unit #1 through #n) are provided for one port unit 40. In embodiment 2, of n pieces of HP unit 50 (50A, 50B, ..., 50n), one HP unit (for example, first HP unit 50A) is designated as the master (representative)

to receive for the first time a request from other system 400 through the port unit 40, the processing load condition in n pieces of HP unit 50 (HP 51) is judged at the master HP unit (50A) and distribution of processing that supports the command is carried out by n pieces of HP unit 50. The multiple HP units 50 are designed to provide the equivalent performance. The disk array system in general, controller 10, and others have the configurations same as those in the embodiment 1.

The internal configuration of each HP unit (#1 through #n) 50 is the same as that of the first HP unit 50A and others shown in embodiment 1. To the HP unit 50 (50A, 50B, . . . , 50n), HP 51 (51A, 51B, . . . , 51n) is provided, respectively. In addition, in each HP unit 50, an area in which a means for communicating with the protocol unit 42 is formed in local memory 53, that is, the above-mentioned OM area 54, OMO 55, IM area 56, IMI 57, and DI area 58, is provided.

In the protocol unit 42 of the port unit 40, an area to form a means for communicating with HP unit 50, that is, OMI 43 {43A, 43B, . . . , 43n}, IMO 44 {44A, 44B, . . . , 44n}, is provided. This is the area corresponding to multiple (n pieces of) HP units 50. For others, the configuration inside CHA 11 is the same as that of the embodiment 1.

Each processing at the time of reading/writing is the same as the processing in the embodiment 1, and processing is distributed between multiple HP units 50. At the time of writing, when a write command is received at the port unit 40 from other system 400 such as host 200 and others, for example, if the first HP unit 50A is set as the master, the command and notification information are transmitted from the protocol unit 42 and stored in the area in the first HP unit 50A. In the first HP unit 50A, judgment processing (the first or the second judgment processing) concerning the processing load condition of each HP for deciding the HP in charge of the processing that supports the command is carried out in the same manner as in the embodiment 1 for multiple HP units including the first HP unit 50A. If, for example, the nth HP 50n is judged to have the least processing load, the first HP unit 50A decides the nth HP unit 50n as the place to take charge of the processing and notifies the protocol unit 42 of the information utilizing each of the above-mentioned areas in order to assign the nth HP unit 50n the processing. The protocol unit 42 transfers the command from the first HP unit 50A to the nth HP unit 50 n in accordance with the notice from the first HP unit 50A and allows the nth HP unit 50n to carry out the processing that supports the command.

In the embodiment 2, the processing load of each HP decreases as the number of distribution objected HPs installed in CHA 11 increases. For modification examples, for example, it is possible to divide multiple (n pieces of) HP units 50 to one port unit 40 into groups of several HP units 50, to designate a master HP in each group, and to carry out distribution of the processing in the same manner. For example, in a configuration in which there are four HP units #1 through #4 for one port unit 40, HP unit #1 and #2 form the first group and HP units #3 and #4 form the second group, and HPs of HP unit #1 and HP unit #3 are designated as a master, respectively. When the command is received, the command is first transmitted to either of the two master HPs from the port unit 40. And the processing is handled by either of the two HPs in each group.

Now, the invention made by the present inventor has been specifically described in accordance with the embodiments, but needless to say, the present invention shall not be limited by any of the details of the above-mentioned embodiments but may be varied in various ways within its spirit and scope.

The present invention can be applicable to a computer system which has one port unit and multiple processors and is configured to include the apparatus with a configuration in which processing that supports a command (request) from other system is distributed among multiple processors.

What is claimed is:

1. A storage system comprising:
a plurality of disk units; and
a controller coupled to the plurality of disk units,
wherein the controller includes therein:
   a plurality of first adaptors, each of which is coupled to a computer and configured to receive an access command from the computer;
   a plurality of second adaptors coupled to the plurality of disk units and configured to control data input/output to/from the plurality of disk units;
   a shared memory for storing control data transmitted between the plurality of first adaptors and the plurality of second adaptors to execute operations according to the access command from the computer; and
   a cache memory for storing data transmitted between the plurality of first adaptors and the plurality of second adaptors,
wherein when a first adaptor of the plurality of first adaptors receives the access command from the computer, the first adaptor stores control data in the shared memory, and the data requested in relation to the received access command is transmitted via the cache memory between the first adaptor and a second adaptor of the plurality of second adaptors, the second adaptor is configured to execute operations according to the control data stored in the shared memory,
wherein each of the plurality of first adaptors includes:
   a plurality of processor units including a first processor unit and a second processor unit, each of which has a memory area used for storing a message to be communicated among a port unit and the plurality of processor units and is configured to execute operations for data transmission between the first adaptor and the cache memory according to the message stored in the memory area; and
   the port unit, configured to receive the access command from the computer, including a protocol unit for storing control information of communication between the computer and the first processor unit, and between the first processor unit and the second processor unit;
wherein when a certain adaptor of the first adaptors receives the access command from the computer, the access command is stored in the memory area of the first processor unit of the certain adaptor, and control information indicating that the access command is processed by the first processor unit is stored in the protocol unit of the certain adaptor,
wherein the first processor unit of the certain adaptor is configured to determine whether to process the access command in the first processor unit of the certain adaptor or to take over processing of the access command to another processor unit in the certain adaptor,
wherein when a second processor unit of the certain adaptor is taking over the processing of the access command from the first processor unit in the certain adaptor, the first processor unit is configured to store the control information in the protocol unit in the certain adaptor, and the access command is transferred via the port unit in the certain adaptor according to the control information stored in the protocol unit.

2. A storage system according to claim 1, wherein each of the plurality of first adaptors further includes:
- a communication line configured to communicate the message among the port unit and the plurality of processor units; and
- a data transfer controller, which is coupled to the cache memory and is configured to control data transmission between the first adaptor and the cache memory.

3. A storage system according to claim 1, wherein one of the plurality of processor units of the certain adaptor is configured to determine which one of the plurality of processor units of the certain adaptor will execute the operations based on (1) a number of processes assigned to said each one of the plurality of processor units of the certain adaptor based on a number of messages stored in the memory area of said each one of the plurality of processor units of the certain adaptor, adapter, or (2) the amount of data, for which operations for data transmission is to be executed by said each one of the plurality of processor units of the certain adaptor.

4. A storage system according to claim 3, wherein said one of the plurality of processor units of the certain adaptor is configured to obtain the number of messages stored in a memory area of each of the plurality of processor units of the certain adaptor, to compare the number of messages among the plurality of processor units of the certain adaptor, and to determine which one of the plurality of processor units of the certain adaptor will execute the operations based on a result of a comparison of the number of messages.

5. A storage system according to claim 3, wherein said one of the plurality of processor units of the certain adaptor is configured to obtain the amount of data transmitted between the first adaptor and the cache memory under a control of each of the plurality of processor units of the certain adaptor by referring a memory area of each of the plurality of processor units of the certain adaptor, to compare the amount of data among the plurality of processor units of the certain adaptor, and to determine which one of the plurality of processor units of the certain adaptor will execute the operations based on a result of a comparison of the amount of data.

6. A storage system according to claim 1, wherein when one of the plurality of processor units of the certain adaptor determines not to execute the operations instructed by the message, said one of the plurality of processor units of the certain adaptor is configured to instruct the port unit to transfer the message to another one of the plurality of processor units of the certain adaptor, and the port unit is configured to read the message from the memory area of said one of the plurality of processor units of the certain adaptor and is configured to store the message in the memory area of said another one of the plurality of processor units of the certain adaptor.

7. A storage system according to claim 6, wherein when the access command is a write command and the message is stored in the memory area of said another one of the plurality of processor units of the certain adaptor, said another one of the plurality of processor units of the certain adaptor is configured to reserve a storage area in the cache memory for storing write data according to the write command, the port unit is configured to receive the write data, and the write data is transferred to the cache memory and stored in the storage area reserved by a different processor unit under the control of the data transfer controller.

8. A storage system according to claim 6, wherein when the access command is a read command and the message is stored in the memory area of said another one of the plurality of processor units of the certain adaptor, said another one of the plurality of processor units of the certain adaptor is configured to designate a storage area in the cache memory storing read data according to the read command, and the port unit is configured to transfer the read data from the storage area in the cache memory to a computer via the data transfer controller.

9. A storage system according to claim 1, wherein when the access command is a write command and one of the plurality of processor units of the certain adaptor determines to execute the operations instructed by the message, said one of the plurality of processor units of the certain adaptor is configured to reserve a storage area in the cache memory for storing write data according to the write command, the port unit is configured to receive the write data, and the write data is transferred to the cache memory and stored in the storage area reserved by said one of the plurality of processor units of the certain adaptor under the control of the data transfer controller.

10. A storage system according to claim 1, wherein when the access command is a read command and one of the plurality of processor units of the certain adaptor determines to execute the operations instructed by the message, said one of the plurality of processor units of the certain adaptor is configured to designate a storage area in the cache memory storing read data according to the read command, and the port unit is configured to transfer the read data from the storage area in the cache memory to a computer via the data transfer controller.

11. A storage system comprising:
a plurality of disk units; and
a controller coupled to the plurality of disk units,
wherein the controller includes therein:
- a plurality of first adaptors, each of which is to be coupled to a computer and is configured to receive an access command from the computer;
- a plurality of second adaptors coupled to the plurality of disk units and configured to control data input/output to/from the plurality of disk units;
- a shared memory for storing control data transmitted between the plurality of first adaptors and the plurality of second adaptors to execute operations according to the access command from the computer; and
- a cache memory for storing data transmitted between the plurality of first adaptors and the plurality of second adaptors, wherein when a first adaptor of the plurality of first adaptors receives the access command from the computer, the first adaptor stores control data in the shared memory, and the data requested in relation to the received access command is transmitted via the cache memory between the first adaptor and a second adaptor of the plurality of second adaptors, the first adaptor is configured to execute operations according to the control data stored in the shared memory, wherein each of the plurality of first adaptors includes:
- a plurality of processor units including a first processor and a second processor unit, each of which has a memory area used for storing a message to be communicated among a port unit and the plurality of processor units and is configured to execute operations for data transmission between the first adaptor and the cache memory according to the message stored in the memory area; and
- the port unit, configured to receive the access command from the computer, including a protocol unit for storing control information of communication between the computer and the first processor unit, and between the first processor unit and the second processor unit;

wherein when a certain adaptor of the first adaptors receives the access command from the computer, the access command is stored in the memory area of the first processor unit of the certain adaptor, and control information indicating that the access command is processed by the first processor unit is stored in the protocol unit of the certain adaptor, wherein the first processor unit of the certain adaptor is configured to determine whether to process the access command in the first processor unit of the certain adaptor or to take over processing of the access command to another processor unit in the certain adaptor, wherein when a second processor unit of the certain adaptor is taking over the processing of the access command from the first processor unit in the certain adaptor, the first processor unit is configured to store the control information in the protocol unit in the certain adaptor, and the access command is transferred via the port unit in the certain adaptor according to the control information stored in the protocol unit, wherein the plurality of processor units corresponding to the port unit are divided into groups with one processor unit of the plurality of processor units designated as a master in each group, and the master distributes execution of the access command among processor units in the group.

12. A storage system according to claim 11, wherein until a load of a processor unit of the plurality of processor units that has received the access command reaches a predetermined threshold value, the processor unit is configured to execute the access command.

13. A storage system according to claim 11, wherein the master decides a processor unit of the plurality of processor units of the certain adaptor has the least processing load in the group to take charge of the processing and notifies the protocol unit in order to assign the processor unit of the plurality of processor units of the certain adaptor the processing.

* * * * *